United States Patent
Wu et al.

(10) Patent No.: US 11,373,100 B2
(45) Date of Patent: Jun. 28, 2022

(54) USING VARIOUS ARTIFICIAL INTELLIGENCE ENTITIES AS ADVERTISING MEDIA

(71) Applicant: Microsoft Technology Licensing, LLC, Redmond, WA (US)

(72) Inventors: Xianchao Wu, Tokyo (JP); Keizo Fujiwara, Kanagawa (JP)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 862 days.

(21) Appl. No.: 15/363,145

(22) Filed: Nov. 29, 2016

(65) Prior Publication Data
US 2018/0150749 A1    May 31, 2018

(51) Int. Cl.
| | |
|---|---|
| G06N 5/02 | (2006.01) |
| G06F 16/903 | (2019.01) |
| G06N 5/04 | (2006.01) |
| G06Q 30/02 | (2012.01) |
| G06F 16/9535 | (2019.01) |
| G06F 40/279 | (2020.01) |

(Continued)

(52) U.S. Cl.
CPC ......... *G06N 5/02* (2013.01); *G06F 16/90335* (2019.01); *G06F 16/9535* (2019.01); *G06F 40/279* (2020.01); *G06N 5/04* (2013.01); *G06Q 10/10* (2013.01); *G06Q 30/0269* (2013.01); *G06N 20/00* (2019.01)

(58) Field of Classification Search
CPC .......... G06N 5/02; G06N 3/006; G06N 20/00; G06N 5/04; G06F 16/90332; G06F 16/9535; G06F 17/2765; G06F 40/279; G06F 16/90335; G06Q 10/10; G06Q 30/0269

See application file for complete search history.

(56) References Cited

U.S. PATENT DOCUMENTS

| | | | |
|---|---|---|---|
| 6,363,301 B1 * | 3/2002 | Tackett | G06F 17/279 |
| | | | 700/246 |
| 6,570,555 B1 | 5/2003 | Prevost et al. | |

(Continued)

FOREIGN PATENT DOCUMENTS

| | | |
|---|---|---|
| WO | 2008000044 A1 | 1/2008 |
| WO | 20160161432 A1 | 10/2016 |

OTHER PUBLICATIONS

"International Search Report and Written opinion issued in PCT Application PCT/US2017/062662", dated Feb. 1, 2018, 14 Pages.

(Continued)

*Primary Examiner* — Kamran Afshar
*Assistant Examiner* — Ryan C Vaughn
(74) *Attorney, Agent, or Firm* — Newport IP, LLC; Leonard J. Hope

(57) ABSTRACT

Described herein is a system and method for providing a conversation session with an artificial intelligence entity that is associated with a business entity. In some aspects, input is provided to an artificial intelligence entity advertisement system. The input is analyzed to determine the subject matter of the input. An artificial intelligence entity associated with the subject matter is then selected and provided to the user. The artificial intelligence entity recommends products or services that are provided by the business entity to the user.

24 Claims, 14 Drawing Sheets

(51) Int. Cl.
*G06Q 10/10* (2012.01)
*G06N 20/00* (2019.01)

(56) References Cited

U.S. PATENT DOCUMENTS

| | | |
|---|---|---|
| 7,689,432 B2 | 3/2010 | Gross |
| 8,738,739 B2 | 5/2014 | Makar et al. |
| 9,098,541 B2 | 8/2015 | Yan et al. |
| 9,275,641 B1 | 3/2016 | Gelfenbeyn et al. |
| 9,647,968 B2 * | 5/2017 | Smullen ............... H04L 51/046 |
| 10,360,906 B2 * | 7/2019 | Schlesinger ............ G10L 15/22 |
| 2005/0015350 A1 | 1/2005 | Foderaro |
| 2008/0288349 A1 | 11/2008 | Weisberg et al. |
| 2009/0119588 A1 | 5/2009 | Moore |
| 2009/0265290 A1 | 10/2009 | Ciaramita et al. |
| 2009/0287537 A1 | 11/2009 | Villoso |
| 2009/0292778 A1 | 11/2009 | Makar et al. |
| 2011/0078105 A1 * | 3/2011 | Wallace ................. G06N 5/047 706/47 |
| 2011/0295847 A1 | 12/2011 | Cucerzan et al. |
| 2013/0225298 A1 * | 8/2013 | Hamlin ............... G07F 17/3234 463/42 |
| 2014/0122407 A1 | 5/2014 | Duan |
| 2014/0164296 A1 | 6/2014 | Duan |
| 2014/0279050 A1 | 9/2014 | Makar et al. |
| 2015/0379074 A1 | 12/2015 | Marschner et al. |
| 2016/0094492 A1 | 3/2016 | Li et al. |
| 2016/0171387 A1 | 6/2016 | Suskind |
| 2016/0294739 A1 * | 10/2016 | Stoehr .................... H04L 51/04 |
| 2017/0353404 A1 * | 12/2017 | Hodge .................... H04L 51/02 |
| 2018/0150524 A1 * | 5/2018 | Anger .................... H04L 51/02 |
| 2018/0152411 A1 * | 5/2018 | Lee ...................... G06Q 10/107 |

OTHER PUBLICATIONS

Zhang, et al., "Bid keyword suggestion in sponsored search based on competitiveness and relevance", In Journal of Information Processing and Management, vol. 50, No. 4, Jul. 2014, pp. 508-523.
"Office Action Issued in European Patent Application No. 17822076.0", dated Feb. 22, 2021, 7 Pages.
"Office Action Issued in Indian Patent Application No. 201917018345", dated Sep. 15, 2021, 8 Pages.

* cited by examiner

USING VARIOUS ARTIFICIAL INTELLIGENCE ENTITIES AS ADVERTISING MEDIA

BACKGROUND

Today, conversational chat programs are becoming more and more popular. These conversational chat programs, sometimes referred to as "chatbots," allow users to carry on conversations with a virtual entity. In some instances, the chatbot may be used to answer a series of questions in a step-by-step manner. However, current chatbots have limited conversational abilities and cannot accurately predict a user's intention.

It is with respect to these and other general considerations that embodiments have been described. Also, although relatively specific problems have been discussed, it should be understood that the embodiments should not be limited to solving the specific problems identified in the background.

SUMMARY

This disclosure generally relates to providing an artificial intelligence entity (e.g., a chatbot) that may be used as an advertising medium. More specifically, the present disclosure enables various business entities to create their own unique artificial intelligence entity that may be used to interact with various users. The artificial intelligence entity may be configured to answer questions for the user, provide information about the business entity, provide recommendations for products and services provided by the business entity and also provide information about the artificial intelligence entity itself.

For example, a user may provide a query to an artificial intelligence advertisement system. Depending on the subject matter of the query, an artificial intelligence entity that is associated with the subject matter is selected. In some implementations, the artificial intelligence entity is also associated with a business entity that offers or otherwise provides a product or service that is associated with the subject matter. The artificial intelligence entity may initiate a conversation session with the user and provide information corresponding to the query including recommendations for products or services provided by the business entity. Additionally, the artificial intelligence entity may request that the user add the artificial entity as a "friend." Once added, the artificial intelligence entity may be automatically selected and provided to a user when a query of the same or similar subject matter is received by the artificial intelligence entity advertisement system.

Accordingly, described herein is a system comprising a processing unit and a memory storing computer executable instructions which, when executed by the processing unit, cause the system to perform a method, comprising: receiving a query and parsing the query to determine one or more keywords contained in the query. Once the keywords are determined, one or more artificial intelligence entities that are associated with the one or more keywords are identified. Each of the one or more artificial intelligence entities is associated with a business entity that provides a product or service, or is otherwise associated with the one or more keywords. At least one of the one or more artificial intelligence entities is selected based on a ranking associated with the one or more artificial intelligence entities and a conversation is initiated with the one of the one or more artificial intelligence entities.

Also described is a method for providing an interaction with an artificial intelligence entity. This method includes receiving an input and analyzing the input to determine a subject matter associated with the input. The method continues by determining, from a pool of artificial intelligence entities, one or more artificial intelligence entities that are associated with the subject matter. One of the one or more artificial intelligence entities is then selected. An interaction with the one of the one or more artificial intelligence entities is provided. Once the interaction is provided, a determination is made, based on received input, whether to associate the one of the one or more artificial intelligence entities with the subject matter.

In further aspects, a computer-readable storage medium storing computer executable instructions is disclosed. When the computer executable instructions are executed by a processing unit, the processing unit performs a method for providing a conversation session with an artificial intelligence entity associated with a business entity. This method includes receiving an input associated with a subject matter and determining whether an artificial intelligence entity is associated with the subject matter. When it is determined that an artificial intelligence entity is associated with the subject matter, a conversation session with the artificial intelligence entity is provided. When it is determined that an artificial intelligence entity is not associated with the subject matter, a new artificial intelligence entity is selected from a pool of artificial intelligence entities and a conversation session is provided with the new artificial intelligence entity.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
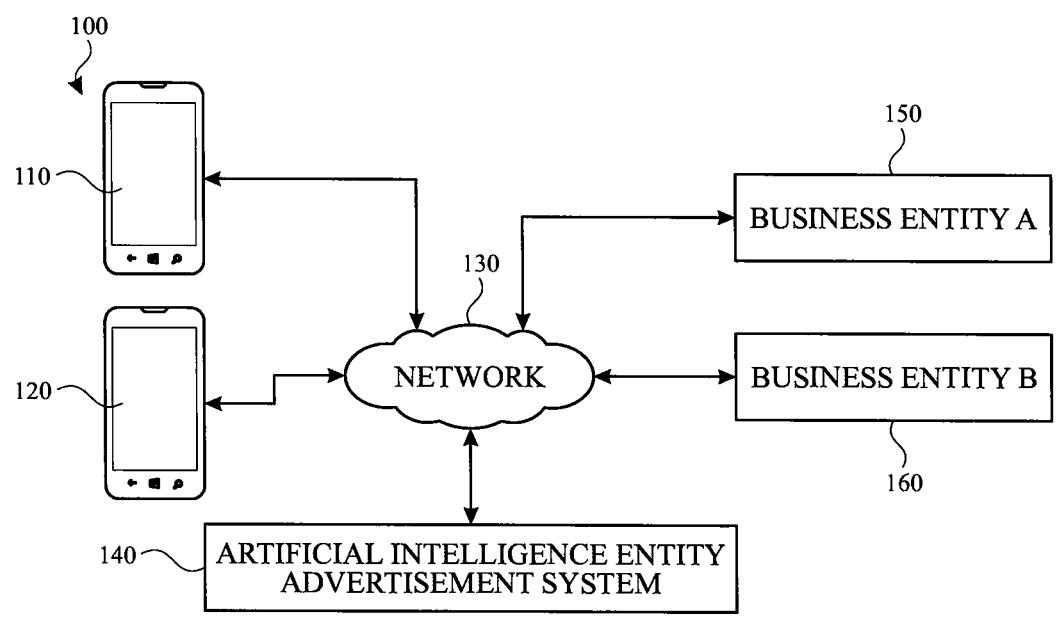
FIG. 1 illustrates a system for providing an artificial intelligence entity advertisement system according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, this disclosure generally relates to an artificial intelligence entity advertisement system. The artificial intelligence entity advertisement system enables various business entities to create an artificial intelligence entity (also referred to herein as "character"). The character may be associated with, have knowledge about, and/or promote various products and/or services that the business entity offers.

In addition to promoting products and services provided by the business entity, the artificial intelligence entity has various characteristics, hobbies, and interests that may be shared with various users. As the users get to know the artificial intelligence entity (e.g., through various interactions and conversation sessions) the user may form a friendship with the artificial intelligence entity, and as a result, the business entity that created the artificial intelligence entity.

For example, if the business entity is a sushi restaurant, the artificial intelligence entity may a fish, a mermaid or other character. The character may be configured to provide information about the restaurant including, but not limited to, the address of the restaurant, the phone number of the restaurant, any specials that are being offered by the restaurant, the current wait time at the restaurant, and so on. The character may also be configured to provide coupons, discounts or other promotions to the user.

In another example, the business entity may be a travel agency or website. As such, the business entity may create an artificial intelligence entity that looks like a bus, a car or an airplane. This character may have information about cheap airline fares, vacation packages that the travel agency or website is offering, and so on. Although specific examples are given, the artificial intelligence entities may take any form and may be associated with various types of business entities.

The artificial intelligence entity advertisement system of the present disclosure may host any number of artificial intelligence entities. Further, each artificial intelligence entity provides a novel way for connecting users with a business entity. As briefly described above, each artificial intelligence entity may have various characteristics and appearances. Additionally, each artificial intelligence entity may have a name, a gender, a nationality, an age, virtual family members, interests, hobbies, voice characteristics and so on.

The artificial intelligence entity may also be programmed to have specific knowledge about the business entity such as described above. For example, the artificial intelligence entity may know a location (or locations) of the business entity, services and/or products provided by the business entity, cost of the services and products provided by the business entity, and so on.

As the artificial intelligence entity has knowledge about the business entity, the artificial intelligence entity may provide this information to the user. More specifically, a user may provide a query, or other input, to the artificial intelligence entity. The query is parsed and provided to the artificial intelligence entity advertisement system. A response to the query is generated and provided to the user via the artificial intelligence entity. The response may include a recommendation for a product or service offered by the business entity.

For example, the user may provide an input of "I am hungry. Is there a place to eat nearby?" In response, an artificial intelligence entity that is associated with a sushi restaurant may be selected to have a conversation with the user. The artificial intelligence entity may respond with "I am hungry too. There is a sushi restaurant called Fantastic Sushi nearby. Would you like directions?"

The user can respond in any number of ways. For example, the user can ask the artificial intelligence entity for directions, can ask for which specials, if any, the restaurant is running, the current wait time, the average cost of a meal and so on. In some instances, the artificial intelligence entity may also ask the user if they would like to become friends. If the user accepts the recommendation and/or the friend request, information about the user is updated and stored. Further, the artificial intelligence entity that the user became friends with may be associated with the keyword "hungry." As a result, the next time the user says "hungry" in a query, the artificial intelligence entity advertisement system may determine (based on past input and/or associations with certain artificial intelligence entities) that the user may want to eat sushi. As such, the artificial intelligence entity associated with the business entity Fantastic Sushi is provided to the user.

In some instances, the user may not want sushi and/or may not want to accept the friend request from the artificial intelligence entity. In such situations, the artificial intelligence entity advertisement system may select a new artificial intelligence entity and provide that to the user. The user preferences may also be updated accordingly.

For example, when the user receives the response "I am hungry too. There is a sushi restaurant called Fantastic Sushi nearby. Would you like directions?", the user may respond with, "I don't feel like eating sushi today. How about a hamburger?" In response to this input, the artificial intelligence entity advertisement system (or the artificial intelligence entity that the user was conversing with) may select or otherwise recommend another artificial intelligence entity to the user. In this example, the new artificial intelligence entity may be associated with a hamburger restaurant.

The user may interact with the new artificial intelligence entity in the same manner as described above. Information about the user is also updated. Thus, the next time the user inputs "hungry" to the artificial intelligence entity advertisement system, the artificial intelligence entity associated with the hamburger restaurant may be provided to the user.

The artificial intelligence entity advertisement system also enables various business entities to place monetary bids on keywords, phrases or categories. When the input provided by the user includes or is otherwise associated with the keywords, phrases or categories that the business entity bid on, the artificial intelligence entity associated with the business entity and the received keyword, phrase or category may be selected and provided to the user.

Although a bidding system is specifically mentioned, other forms of payment methods may be used in order to increase a likelihood that an artificial intelligence entity of a particular business entity may be provided to the user in response to received input from the user. These and other embodiments will be described in greater detail below.

FIG. 1 illustrates a system 100 for providing advertisements to users using various artificial intelligence entities. The system 100 enables one or more business entities (e.g., Business Entity A 150 and Business Entity B 160) to create and maintain one or more artificial intelligence entities. Once created, each of the artificial intelligence entities in the system 100 may interact with various users and promote products and services provided by the business entities.

For example, a user may access the system 100 using a computing device such as, for example, computing device 110 and computing device 120. Computing device 110 and computing device 120 may be any computing device capable of connecting to a network 130. Example computing devices include, but are not limited to, a mobile telephone, a smart phone, a tablet, a phablet, a smart watch, a wearable computer, a personal computer, a desktop computer, a laptop computer, a gaming device/computer (e.g., XBOX®), a television, and the like.

Although computing devices are shown, the embodiments described herein may be implemented on any number of systems. For example, the artificial intelligence entities may be provided in a conversation system that is incorporated in automobiles, home appliances, and so on. In addition, the artificial intelligence entities may be provided as part of third party communication and/or collaboration software.

The computing device may include an interface (e.g., a user interface) that enables the user to interact with the various artificial intelligence entities that are part of the system 100. For example, a user may utilize the interface to provide input to the computing device. The input may be a statement, a query, an image, a sound or recording, and so on. Once the input is received, the input may be provided, over the network 130, to an artificial intelligence entity advertisement system 140.

The artificial intelligence entity advertisement system 140 parses the input to determine a subject matter of the input. Once the subject matter of the input is determined, the artificial intelligence entity advertisement system 140 determines which artificial intelligence entity to provide to the user.

In some embodiments, the artificial intelligence entity advertisement system 140 hosts various artificial intelligence entities and each artificial intelligence entity may be associated with, or have knowledge about, a particular subject matter. Thus, when input is received and parsed, the artificial intelligence entity advertisement system 140 may determine which artificial intelligence entity may provide the best user experience to the user. The determined artificial intelligence entity is then provided to the user via the interface. The user can choose to initiate a conversation session with the selected artificial intelligence entity or ask for a different artificial intelligence entity.

Once the conversation session has started, the artificial intelligence entity advertisement system 140 may store additional information about the user based on the interaction with the artificial intelligence entity. This information may then be used to determine demographic information about the user, interests and hobbies of the user, favorite foods of the user, and so on. This information may also be used to recommend additional artificial intelligence entities to the user.

The system 100 allows various business entities (e.g., Business Entity A 150 and Business Entity B 160) to create one or more artificial intelligence entities (or characters). These artificial intelligence entities are programmed to have knowledge about various products and services provided by the business entity. Additionally the artificial intelligence entities may have human-like attributes or traits.

For example, the artificial intelligence entities may have hobbies, an age, a gender, specific background information, virtual families, names, and so on. Once these artificial intelligence entities are created, they may be hosted by the artificial intelligence entity advertisement system 140. As discussed above, when input from a user is received, the artificial intelligence entity advertisement system 140 determines, based on the subject matter of the input, which artificial intelligence entity should be provided to the user. As the user interacts with the artificial intelligence entity, discovers more information about the artificial intelligence entity, and comes to rely on recommendations provided by the artificial intelligence entity, the user may form a virtual friendship with the artificial intelligence entity.

In some aspects, the artificial intelligence entity advertisement system 140 may host many artificial intelligence entities, with each entity being associated with keywords, categories, phrases and business entities. As such, the artificial intelligence entity advertisement system may rank the various artificial intelligence entities. In some aspects, the artificial intelligence entities that have the highest ranking may have a higher probability to be provided to a user in response to received input.

In order to increase a ranking of a particular artificial intelligence entity, a business entity may bid on (or otherwise pay to have access to or otherwise be associated with) keywords, phrases, GPS coordinates, images, sounds, and so on. If the input provided by the user includes or is otherwise associated with the keywords, phrases, etc., the artificial intelligence entity of that particular business entity has a higher probability (when compared to artificial intelligence entities associated with business entities that did not bid, or have a lower bid amount, on the same or similar keywords, phrases, etc.) to be provided to the user. Once provided to the user (e.g., via a user interface), the artificial intelligence entity may promote or otherwise provide information about the products and services provided by the business entity.

For example, Business Entity A 150 may be a convenience store and may have created an artificial intelligence entity named "Rinna." Rinna is programmed with specific characteristics and traits and also has specific knowledge about Business Entity A 150.

For example, Rinna may know the location of the business entity, what specials, promotions or deals are currently being offered by the business entity and so on. Further, Rinna may offer the user a discount on particular purchases, coupons and so on. In order to increase the probability that Rinna is provided to various users, Business Entity A 150 may have bid on certain keywords that would trigger Rinna being selected by the artificial intelligence entity advertisement system 140. In this particular example, Business Entity A 150 is a convenience store. As such, Rinna may be associated with various keywords about products that a convenience store offers (e.g., thirsty, hungry, snack, soda, chips, candy, and so on). Accordingly, Business Entity A 150 may determine bid amounts for each keyword.

When input from a user is received, it may be determined that the input includes one of the keywords that Business Entity A 150 bid on. As such, the likelihood that Rinna will be provided to the user increases.

For example, the input that is received from a user may include the phrase "I am hungry. Where is a good place to grab a snack?" The input is parsed and the keywords "hungry" and "snack" are identified. The artificial intelligence entity advertisement system 140 determines which artificial intelligence entities are associated with the identified keywords and ranks them.

The ranking of the various artificial intelligence entities may be based on a variety of factors, including bid amounts by the various business entities. In this example, the artificial intelligence advertisement system 140 may determine that Rinna should be provided to the user. As a result, the artificial intelligence entity advertisement system 140 provides Rinna to the user via a user interface and enables the user to have a conversation with her.

Continuing with the example above in which the input was "I am hungry. Where is a good place to grab a snack?", Rinna may respond by informing the user that Business Entity A 150 is nearby. Rinna may also inform the user that Business Entity A has a buy one, get one free, on potato chips. Rinna may also provide additional information to the user. For example, Rinna may also inform the user that the Business Entity A 150 also has 32 oz. sodas for $0.59.

If the user accepts the conversation with the selected artificial intelligence entity, artificial intelligence entity information associated with the user is updated. For example, the artificial intelligence entity Rinna may be associated with the keywords, "convenience store," "hungry," "snack", and so on. Thus, the next time the input from the user includes those keywords, the artificial intelligence entity advertisement system 140 initiates a conversation between Rinna and the user.

In some implementations, as the user interacts with the artificial intelligence entity, additional information about the user may be identified. This information may then be used by the business entity to create additional characters and/or enhance the artificial intelligence entity the user is interacting with.

In aspects, the artificial intelligence entity may determine or otherwise deduce information about the user based on input that is provided to the artificial intelligence entity advertisement system 140. For example, the input from the user may be "I need an afterschool snack." From this input the artificial intelligence entity (or the artificial intelligence entity advertisement system 140) may be able to deduce that the user is a school-aged person.

The artificial intelligence entity advertisement system 140 may also be able to use inferred or ancillary information to determine additional details about the user. Continuing with the example above, if the input "I need an afterschool snack." is received at 3:00 PM the artificial intelligence entity advertisement system 140 may determine that the user is between the age of 6 and 12 and goes to elementary school as 3:00 PM is usually the time of day that elementary school ends and children ages 6-12 typically go to elementary school.

The artificial intelligence entity and/or the artificial intelligence entity advertisement system 140 may also be able to determine information about the user based on whether or not the user accepted or otherwise acted on the recommendation from the artificial intelligence entity. As the interactions between the artificial intelligence entity and the user continue, the artificial intelligence entity may then be better able to determine intentions of the user. For example, if the user provides input of "I am really thirsty and want a cup of coffee.", the artificial intelligence entity advertisement system 140 may infer that the keyword "thirsty" should be associated with the keyword "coffee." In subsequent interactions between the user and the artificial intelligence entity in which the keyword "thirsty" is identified, the artificial intelligence entity advertisement system 140 may provide a coffee house artificial intelligence entity to the user. The coffee house artificial intelligence entity may then suggest that the user go to its associated business entity for coffee.

Figure 2:
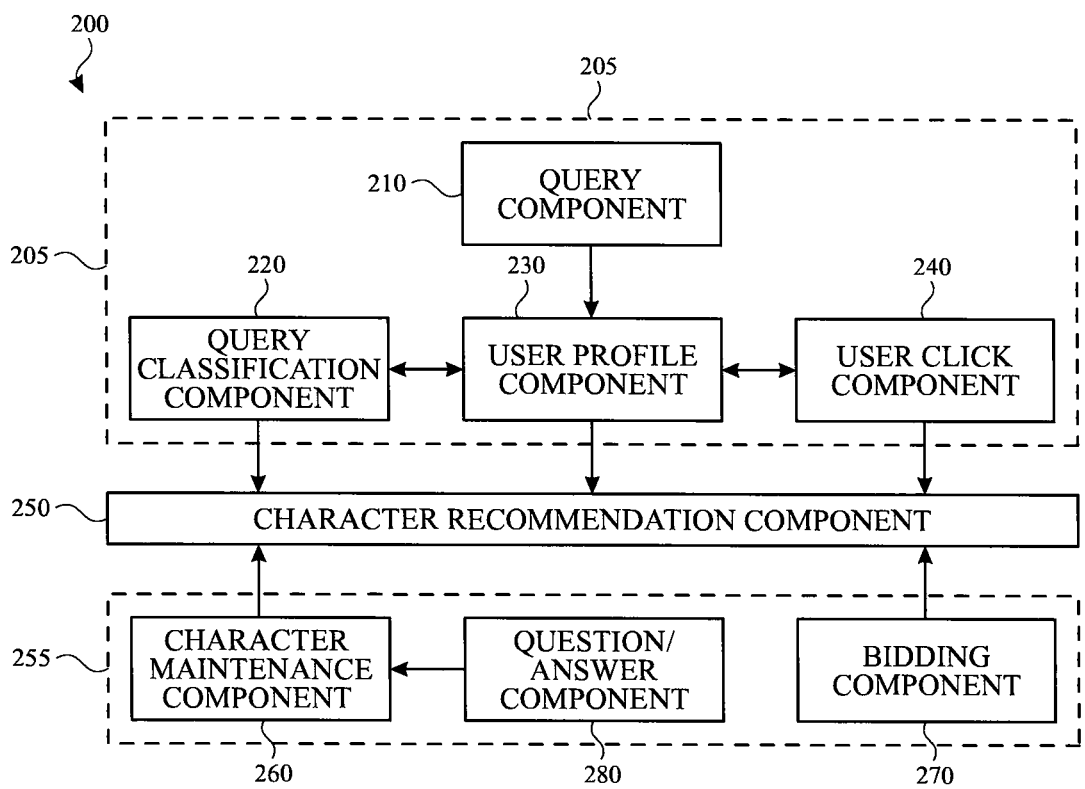
FIG. 2 illustrates components of an artificial intelligence entity advertisement system according to an example embodiment.

FIG. 2 illustrates components of an artificial intelligence entity advertisement system 200 according to an example embodiment. In some embodiments, the artificial intelligence entity advertisement system 200 may be the artificial intelligence entity advertisement system 140 described above with respect to FIG. 1.

In some aspects the artificial intelligence entity advertisement system 200 may include different, but related parts, with each part being made up of various components that work together to provide various artificial intelligence entities to users.

The first part of the artificial intelligence entity advertisement system 200 is a user experience part 205. The user experience part 205 includes a query component 210, a query classification component 220, a user profile component 230 and a user click component 240.

The query component 210 may be used to provide an interface to the user. The interface may be used to accept input from a user and to provide a response from a selected artificial intelligence entity. In aspects, the input may be textual input, voice input, image input, sound input, location information, and so on. In some instances, when the input is sound, voice or image input, the input is converted into text using a voice-to-text API or an image-to-text API. Once converted, the context of the input may be determined so the artificial intelligence entity advertisement system 200 may be able to determine which artificial intelligence entity should be provided to the user.

The query classification component 220 receives the input and determines or predicts the user's intentions. For example, the query classification component may look for various keywords or phrases in the input. Once the keywords are identified, the query classification component 220 may determine the subject matter of the input and/or the intentions of the user.

For example, if the input includes the keywords "vacation" or "beach," the query classification component 220 may determine that the subject matter of the query is related to traveling. Likewise, if the input includes the keywords "hungry" or "dinner," the query classification component 220 may determine that the subject matter of the query is related to restaurants, supermarkets, and/or convenience stores. The query input component 220 may also look at the punctuation and grammar of the input in an attempt to determine the user's intention.

The user profile component 230 is used to predict or otherwise determine information about user as the user interacts with the artificial intelligence entity advertisement system 200. For instance, the user profile component 230 may predict a user's gender and age based on a user's query patterns or topics.

For example, an input from a user may be "Remind me to pick up flowers for my wife on the way home from work." From this input, the user profile component 230 may determine that the user is married and is a male (based on the keyword wife). Additionally, the user profile component 230 may also determine that the user is old enough to have a job and is currently working. As such, the user profile component 230 may determine that the user is between the ages of 25 and 65.

As additional input is provided and as the user continues to interact with the various artificial intelligence entities that are part of the he artificial intelligence entity advertisement system 200, additional information about the user may be deduced. In other aspects, the artificial intelligence entity may ask the user for specific information.

The user click component 240 may be used to track a click history or a selection history of the user. The click history may be associated with recommendations provided by the artificial intelligence entity and/or the artificial intelligence entity advertisement system 200. For example, an artificial intelligence entity may provide the user with a number of options in response to an input by the user. When the user clicks or otherwise selects or chooses one of the options, the selection is stored by the user click component 240.

In one example, an artificial intelligence entity may provide three food options (e.g., hamburger, pizza and burrito) for user in response to an input having the keyword "hungry." Based on the user's selection of one (or more) of the options, the user click component 240 may associate the keyword "hungry" with the selected option (e.g., pizza). Thereafter, if the input provided by the user includes the keyword "hungry" there is a higher probability (when compared to artificial intelligence entities that are not associated with the keyword "pizza") that artificial intelligence entities associated with pizza restaurants will be provided to the user.

In another example, the artificial intelligence entity advertisement system may provide the user with a number of different artificial intelligence entities based on received input. When the user selects one of the artificial intelligence entities to converse with, this selection is stored by the user click component 240.

For example, in response to received input, the artificial intelligence entity advertisement system 200 may provide an artificial intelligence entity from Business Entity A 150 (FIG. 1) and an artificial intelligence entity from Business Entity B 160 (FIG. 1). In this example, Business Entity A 150 and Business Entity B 160 offer the same or similar products and services but each have a different artificial intelligence entity. The artificial intelligence entity advertisement system 200 may present the artificial intelligence entity associated with Business Entity A 150 to the user in response to a query.

Once the artificial intelligence entity is provided, the user may choose to converse with and/or "friend" the artificial intelligence entity associated with Business Entity A 150. The user may also request a different artificial intelligence entity to converse with. If the user decides to request a different artificial intelligence entity, the artificial intelligence entity associated with Business Entity B 160 may be presented to the user. The user can then choose to converse with this entity or select a different entity. As discussed above, this selection information may be stored by the user click component 240 and be subsequently used to provide additional recommendations to the user.

In aspects, the query classification component 220, the user profile component 230 and the user click component 240 may be configured to share data and/or provide data to a character recommendation component 250. The character recommendation component 250 will be discussed in more detail below.

The artificial intelligence entity advertisement system 200 also includes a business entity part 255. The business entity part 255 provides an interface that enables the various business entities to add, update, edit and/or create their associated artificial intelligence entities. The business entity part 255 includes a character maintenance component 260, a bidding component 270 and a question/answer component 280.

The character maintenance component 260 allows a business entity to maintain, create or otherwise have access to each of the associated characters or artificial intelligence entities. For example, a business entity may use the character maintenance component to update a name, appearance, gender, hobbies, virtual family members, and so on of the artificial intelligence entity. As discussed above, a single business entity may have multiple artificial intelligence entities. Accordingly, the character maintenance component 260 allows the business entity to maintain each of their artificial intelligence entities.

The bidding component 270 is an interface that is provided to each business entity and enables the business entity to customize keywords, categories and/or GPS locations that they want their artificial intelligence entities to be associated with. In some implementations, the business entity may be allowed to bid on the various keywords, categories and/or GPS locations they want their artificial intelligence entity to be associated with. In some instances, the more money the business entity is willing to pay, the more exposure the artificial intelligence entity associated with the business entity will receive.

For example, if the business entity is a sushi restaurant located near Pike Place Market in Seattle, Wash., the business entity may want to bid on the phrases and keywords "Pike Place Market", "sushi", and "Seattle." Thus, when a query of "Where is a good sushi place near Pike Place Market?" is received, the artificial intelligence entity associated with the sushi restaurant may be selected and provided to the user.

In other implementations, the business entity may bid on specific GPS coordinates or a range of GPS coordinates. For example, if the user is near Pike Place Market and shares his location with the artificial intelligence entity advertisement system 200 and provides the query "Is there a good sushi place around here?" or "Is there anywhere to eat around here?", the artificial intelligence entity advertisement system 200 may provide the artificial intelligence entity associated with the sushi restaurant to the user.

The bidding component 270 may also provide information about the return on investment of each keyword. For example, the bidding component 270 may track or otherwise provide the number of times various keywords, categories, phrases and GPS locations were used, the current ranking of various keywords and so on. This bidding component 270 may also enable the business entities to alter their bids, change keywords and so on.

The question/answer component 280 is used to track or otherwise collect frequently asked questions by the various users. These questions may then be provided to the business entities. The business entities may then decide how to answer or otherwise respond to these questions. For example, the business entities may decide to supply additional materials such as web links, customer service phone numbers, and so on to certain questions. The question/answer component 280 may be used to improve a user's satisfaction rating with a particular artificial intelligence entity, which also improves the user's engagement with a particular artificial intelligence entity and, ultimately, their relationship with the business entity.

In some instances, the question/answer component 280 may share information with the character maintenance component 260. For example, if information about the business entity has changed or the artificial intelligence entity needs additional information (e.g., to frequently asked questions) the additional information may be provided from the question/answer component 280 to the character maintenance component 260.

The character recommendation component 250 receives information from the user experience part 205 and the business entity part 255 and uses the information to recommend an artificial intelligence entity. For example, the character recommendation component 250 receives information from the query classification component 220, the user profile component 230 and the user click component 240 and also receives information from the character maintenance component 260 and the bidding component 270. Using this information, the character recommendation component 250 constructs a relevance-based character recommendation for the user. For example, the character recommendation component determines which artificial intelligence entity should be provided to the user.

In some embodiments, the character recommendation component 250 may have a pool of artificial intelligence entities that may be selected. The various artificial intelligence entities may be sorted by subject matter, company type, keywords, GPS coordinates, and so on. Further, each artificial intelligence entity may be ranked such as described above.

When an input is received from a user, the character recommendation component 250 determines which artificial intelligence entity, from the pool of artificial intelligence entities, should be provided to the user. The determination is based on various factors, including the keywords contained in the received input, the click history of the user, the demographics of the user, the bid amount of business entities, and so on.

For example, if the click history of the user shows that the user is more likely to select female artificial intelligence entities over male artificial intelligence entities, female artificial intelligence entities may be ranked higher than male artificial intelligence entities. Likewise, if Business entity A 150 and Business Entity B 160 bid on the same keywords, but Business Entity A 150 is paying more for the keywords than Business Entity B 160, the artificial intelligence entity associated with Business Entity A 150 will be ranked higher than the artificial intelligence entity associated with Business Entity B 160. As such, the artificial intelligence entity associated with Business Entity A will have a higher probability of being presented to a user.

Once the artificial intelligence entity has been selected from the pool of artificial intelligence entities, the selected artificial intelligence entity is provided or otherwise presented to the user via a user interface. The user and the artificial intelligence entity may then engage in a conversation session.

For example, the artificial intelligence entity may provide information associated with the input provided by the user. Continuing with the example above, in response to the input of "Is there anywhere to eat around here?", the selected artificial intelligence entity may respond with the address of the sushi restaurant that the artificial intelligence entity is associated with, current wait time at the restaurant, daily specials, coupons, discounts, and so on.

In some aspects, the artificial intelligence entity may also request that the user add her as a friend. If the user chooses to add the artificial intelligence entity as a friend, this information is stored by the user click component 240 and/or the user profile component 230. Subsequent queries, related to the same subject matter, may then be handled by this artificial intelligence entity.

If the user does not add the artificial intelligence entity as a friend, the character recommendation component 250 may suggest a different artificial intelligence entity to the user. This information is also included in the user click component 240. In some implementations, the user click component 240 may provide information to the character recommendation component 250 that if a user adds a particular artificial intelligence entity as a friend, they are more likely (or less likely) to add another specific artificial intelligence entity as a friend.

For example, based on click history from a number of different users, it may be determined that if a user adds the artificial intelligence entity associated with Business Entity A 150 as a friend, they are more likely to add an artificial intelligence entity associated with Business Entity C (not shown) and are less likely to add an artificial intelligence entity associated with Business Entity B 160. This information may be provided to and used by the character recommendation component 250 when artificial intelligence entities are selected in response to received input.

In some implementations, the character recommendation component 250 may be configured to show the top two or three artificial intelligence entities to a user in response to received input. The user may then select the artificial intelligence entity they want to converse with. This selection may also be provided to and stored by the user click component 240.

Figure 3:
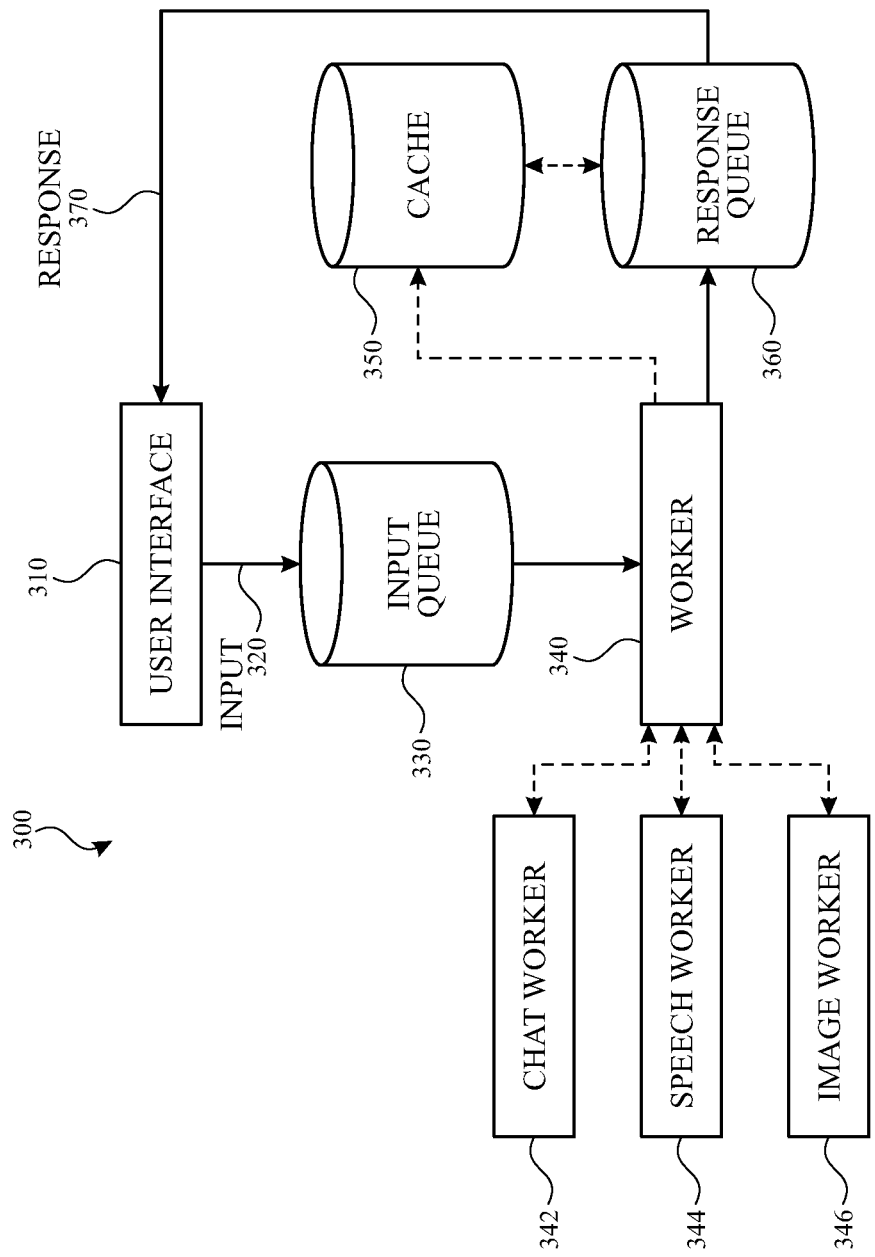
FIG. 3 illustrates example components of a query component of the artificial intelligence entity advertisement system of FIG. 2 according to an example embodiment.

FIG. 3 illustrates example components of a query component 300 of an artificial intelligence entity advertisement system. In some embodiments, the query component 300 may be the query component 210 of the artificial intelligence entity advertisement system 200 shown in FIG. 2. In some instances, the query component 300 may be used to interact or otherwise interface with a selected or provided artificial intelligence entity.

The query component 300 may include a user interface 310 that provides an input area in which the user can provide input to the query component 300. The input may include typed text, provide or otherwise attach an image file, provide voice input, select emoji symbols, make an audio or voice call, and/or initiate a video conversation with the artificial intelligence entity advertisement system 200. The user interface 310 may also be used to receive responses from the artificial intelligence entity. As with the input provided by the user, the response provided by the artificial intelligence entity may include text, images, sound, video, and so on.

Once the input 320 is received by the user interface 310, it is provided to an input queue 330. The input queue 330 is used to make sure that the input 320 (e.g., requests and queries) is served or otherwise responded to by a worker 340 in a first-in-first-out manner.

In aspects, when the worker 340 receives input 320 from the input queue 330, the worker 340 may user various sub-workers (or sub-components) to determine how to respond to the input 320. For example, the worker 340 may be associated with a chat worker 342 that responds to text-style requests and input. In some embodiments, the chat worker 342 utilizes a language understanding API to determine a context of the received input 320. The chat worker 342 can also include various support workers such as a time service (to handle input such as "Remind me to watch the Seahawks game at 6:30 PM"), a weather service (to handle input such as "What is the weather going to be like tomorrow?" or "I am flying to Denver tomorrow, is it snowing there?") and so on.

The worker 340 may also be associated with a speech worker 344 that recognizes sounds and other voice input and converts it text. The speech worker 344 may utilize a speech recognition API to perform the conversion. In some aspects, once the sound input is converted to text, the speech worker 344 may provide the newly converted text to the chat worker 342 in order to determine the context of the converted text and may request information on how to respond to the input 320. Once a response is generated, the speech worker 344 may convert the text to speech and provide the response back to the worker 340.

Likewise, an image worker 346 may be used to determine subject matter contained in a received image or video file. In aspects, the image worker 346 may use an image recognition API to read and understand the received image. For example, a received image may need to be decoded into text in order for an appropriate response to be generated. Thus, if the image that is provided is of a dog, image worker 346 may be able to determine the type of the dog, the color of the dog, and so on. This information, in text form, may be provided to the chat worker 342. The chat worker 342 may generate or provide a number of different comments/suggestions that may be used in response. For example, the response may be "What a beautiful German Shepherd! What is his name?" In some instances, the image worker 346 may be trained to generate appropriate responses to a received image.

Although specific workers are mentioned, additional workers may be added based on the type of received input. For example, the query component 300 may allow various plug-in workers to be dynamically added (or removed) to further enhance the user experience based on the received input. For example, a location-based worker can be dynamically added when location-based input is received (e.g., "Order a pizza and have it delivered to my office." Or "Remind me to stop at the supermarket on my way home.").

Once the input 320 is parsed, the worker 340 may be used to generate a response 370. In some instances, the worker 340 may access a question/answer component (e.g., question/answer component 280 (FIG. 2)) of a business entity such as described above. Once a response 370 is generated, it is provided to a response queue 360 and/or to a cache 350. In some embodiments, the cache 350 may be used to ensure that a sequence of responses 370 are provided to the user in a predefined order (e.g. an appropriate time-based order). For example, if input provided by the user causes two responses to be generated, each response may be cached and then provided to the user in a logical, time-ordered manner.

In a more specific example, if the input from the user is: "Rinna, did you have breakfast this morning?", the system may generate two different responses. The first response 370 may be "Yes, I had some eggs and toast." and the second response may be "What did you have for breakfast?" The first response needs to be shown to the user before the second response. As such, the cache 350 may be used to ensure that the first response is provided to the user before the second response, regardless of the processing time required to generate each response. This also helps ensure that the user feels like he is having a conversation with the artificial intelligence entity. In some aspects, the cache 350 may be used to add a time delay (e.g., a 2 second time delay) between responses.

In other implementations, the generated response 370 may be sent to a response queue 360. The response queue 360 then provides the generated response 370 to the user interface 310.

In some embodiments, the response 370 may be an audio (speech) response, a text response, a video response, an image response or a combination thereof. For example, in response to the user providing the image of the dog, the worker 340 may determine that the particular artificial intelligence entity that the user is conversing with also "owns" a dog. A response, including the image of the dog of the artificial intelligence entity, along with the text "This is my dog Trigger. Do you like him?" may be generated and provided to a user.

As described above, the input that is provided by the user, in addition to how the user responds to the generated response 370, may be tracked and stored in a user profile 230 and/or a user click component 240. This information may subsequently be used by a character recommendation component 250 such as described above.

Figure 4:
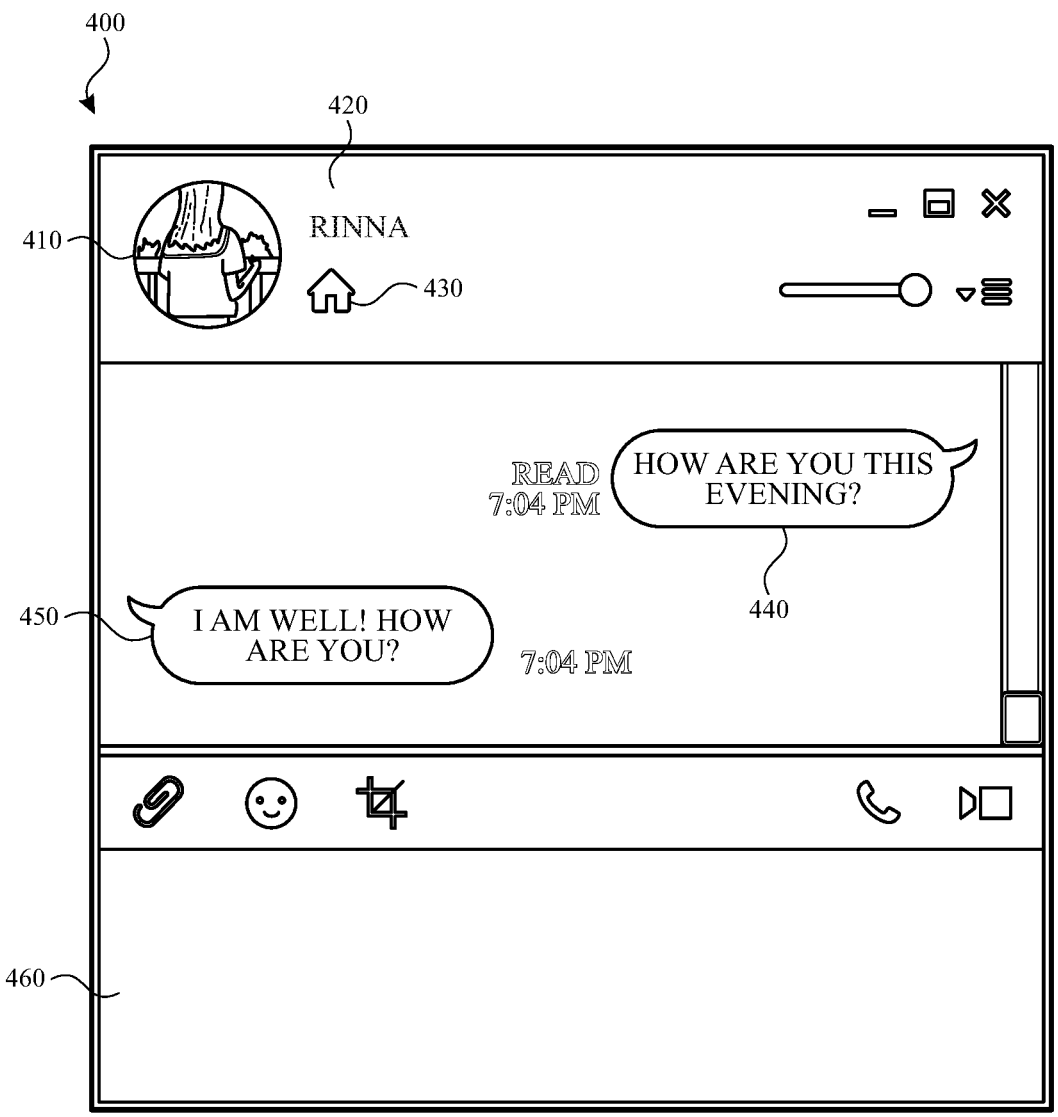
FIG. 4 illustrates an example user interface that may be provided by an artificial intelligence entity advertisement system according to an example embodiment.

FIG. 4 illustrates an example user interface 400 that may be provided by an artificial intelligence entity advertisement system, such as the artificial intelligence entity advertisement system 140 (FIG. 1) that enables a user to interact with one or more artificial intelligence entities.

In some embodiments, the user interface 400 includes an image 410 of the artificial intelligence entity (or an image or logo associated with the business entity with which the artificial intelligence entity is associated), a name 420 of the artificial intelligence entity (or a name of the business entity) and a homepage icon 430, that when selected, will direct the user to a homepage of the business entity (or a homepage of the artificial intelligence entity). The user interface 400 also includes an input area 460 that enables the user to provide input (e.g., text input, audio input, image input, an emoji, and so on). The user interface 400 also includes an output area that shows a received input 440 and a response 450 from the artificial intelligence entity.

In some embodiments, the user interface 400 may be associated with the user interface 310 of FIG. 3. Thus, the sentence, "How are you this evening?" is provided to the input queue 330 which stores the input in various multimedia formats such as described above.

Figure 5:
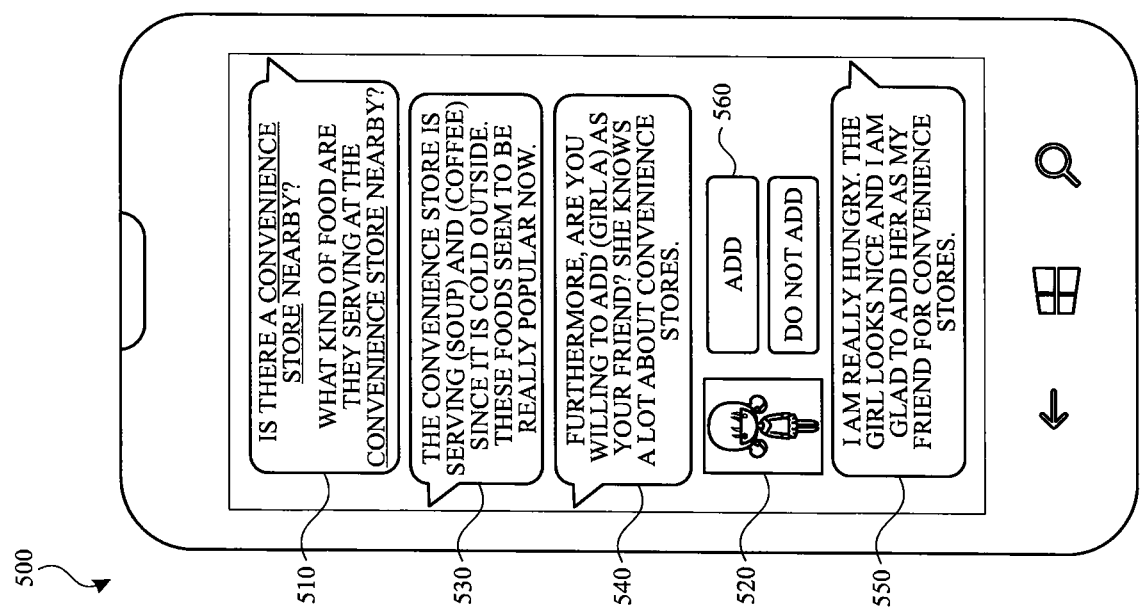
FIG. 5 illustrates an example user interface for a query-based artificial intelligence entity recommendation according to an example embodiment.

FIG. 5 illustrates an example user interface 500 for a query-based artificial intelligence entity recommendation. The user interface 500 may be provided on an electronic device, as part of a navigation or audio system of an automobile, home appliance, and so on. The user interface 500 may also be part of a conversation software or business collaboration software. In some aspects, the user interface 500 shown in FIG. 5 may be provided by an artificial intelligence entity advertisement system, such as the artificial intelligence entity advertisement system 140 (FIG. 1).

In this example, the user provides input 510 that is associated with a specific category or keywords. For example, the user input may include the phrase "Is there a convenience store nearby?" or "What kinds of food are they serving at the convenience store nearby?" In this example, the phrase "convenience store" is underlined to indicate that this is a keyword. However, the underline is shown for example purposes only and may be omitted.

When the input 510 is received, the input is parsed (e.g., by a worker 340 (FIG. 3)) and the subject matter of the input 510 is determined. As described above, the subject matter is identified as "convenience store." Based on the determined subject matter, an artificial intelligence entity is selected from a pool of artificial intelligence entities. The selection may be based on the determined subject matter, other artificial intelligence entities the user is friends with or is associated with, interests of the user, demographics of the user, and so on.

In this example, the artificial intelligence entity advertisement system selects "Girl A" 520 as the artificial intelligence entity. Girl A 520 is associated with a particular business entity that owns or otherwise operates convenience stores. Girl A 520 may provide a response 530 to the input 510. In this example, the response 530 to the input 510 states "The convenience store is serving soup and coffee since it is cold outside. These foods seem to be really popular right now."

In this example, the terms "soup" and "coffee" are indicated with parentheses as they are products related to the convenience store and are being recommended to the user. However, the parentheses are shown to highlight the concepts described herein and may be omitted. Girl A 520 may also provide an additional response 540 that states "Furthermore, are you willing to add Girl A as your friend? She knows a lot about convenience stores."

If the user wants to add Girl A 520 as a friend, the user may select the "Add" button 560. In other embodiments, the artificial intelligence entity may be added in response to a verbal confirmation, textual confirmation, or a received action (e.g., a swipe, a motion detected by a camera associated with the computing device on which the user interface 500 is provided, and so on).

In this example, the user provides a response 550 indicating that the user would like to add the artificial intelligence entity as a friend. Once the artificial intelligence entity has been added, the user can directly communicate with the Girl A from then on. For example, the user can provide input that directly contacts Girl A (e.g., the input may be "Hi Girl A. How are you this morning?") and have a conversation with her.

If the user chooses not to add Girl A as a friend, other artificial intelligence entities from other business entities that are related to the same category (e.g., convenience stores) may be recommended to the user. As discussed above, each interaction with an artificial intelligence entity (including whether the artificial intelligence entity was added as a friend or not) is provided to a user click component (e.g., user click component 240 (FIG. 2)) and/or a user profile component (e.g., user profile component 230 (FIG. 2)) such as described above.

Figure 6:
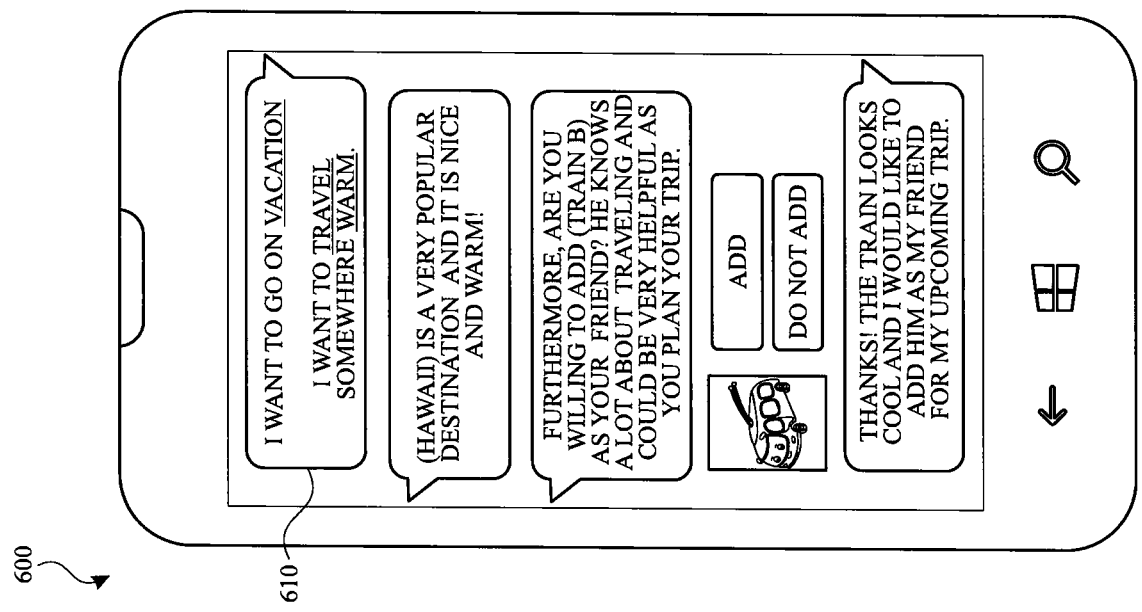
FIG. 6 illustrates another example user interface for a query-based artificial intelligence entity recommendation according to an example embodiment.

FIG. 6 illustrates another example user interface 600 for a query-based artificial intelligence entity recommendation. The user interface shown in FIG. 6 may be provided by an artificial intelligence entity advertisement system, such as the artificial intelligence entity advertisement system 140 (FIG. 1).

This example is similar to the example shown and described in FIG. 5. However, in this example, the determined category for the input 610 is "vacation." Using this category (and other information associated with the user), the artificial intelligence entity advertisement system may recommend "Train B" as a friend. The user may add Train B as a friend or may request a new recommendation such as described above.

In some examples, artificial intelligence entities may be configured to recommend other artificial intelligence entities to the user. For example, the user may ask Girl A for a recommendation for an artificial intelligence entity that knows a lot about traveling. As a result, Girl A may recommend that the user "friends" Train B. In some instances, each artificial intelligence entity (e.g., Train B and Girl A) may be owned by the same business entity. In other instances, each artificial intelligence entity may be owned by different business entities.

Figure 7:
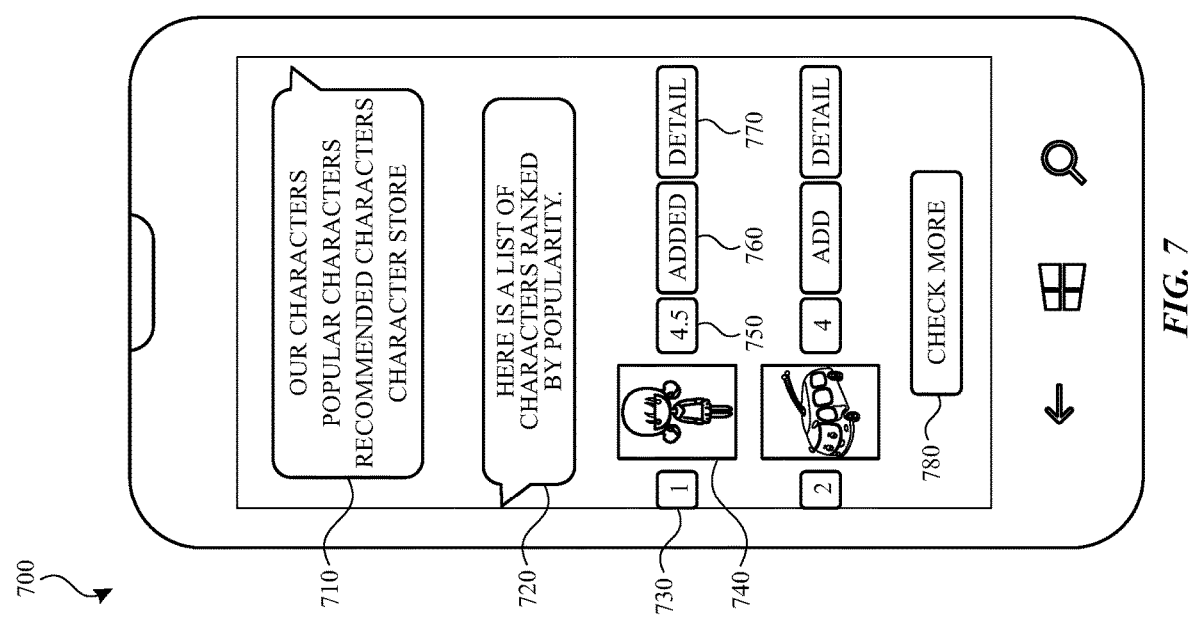
FIG. 7 illustrates another example user interface for a query-based artificial intelligence entity recommendation according to an example embodiment.

FIG. 7 illustrates another example user interface 700 for a query-based artificial intelligence entity recommendation. The user interface shown in FIG. 7 may be provided by an artificial intelligence entity advertisement system, such as the artificial intelligence entity advertisement system 140 (FIG. 1).

In this example, the input 710 provided by the user may be a request to navigate through popular artificial intelligence entities. Thus, unlike the examples in FIG. 5 and FIG. 6 in which a user's query was used as a trigger for a recommendation, a user may be able to browse characters and manually select the characters they want to add.

For example, the input 710 may be a voice input or text input of "popular characters" or "recommended characters." A response 720 may be generated by the artificial intelligence entity advertisement system that shows a list 730 of the popular artificial intelligence entities.

In some instances, the artificial intelligence entities may be ranked based on the number of friends. The list 730 may also include a picture 740 of the artificial intelligence entities, a score 750 associated with the artificial intelligence entities and an option 760 that enables the user to add the artificial intelligence entities as friends (if the entity is not already added (see for example, the option 760 next to Girl A indicates that Girl A has already been added as a friend while the option next to Train B indicates that Train B can be added as a friend)).

The user interface 700 may also allow the user to find out more about the artificial intelligence entity by selecting a "Detail" button 770. In some embodiments, selection of the Detail button 770 directs the user to a webpage or other information screen that provides information about the artificial intelligence entity and/or the business entity associated with the artificial intelligence entity. The user interface 700 also allows a user to see additional artificial intelligence entities by selecting a "Check More" button 780.

Using this user interface 700, a user can add all the artificial intelligence entities he/she is interested in. This function helps users save time and to allows them to learn detailed information of each artificial intelligence entity they may want to friend.

Figure 8:
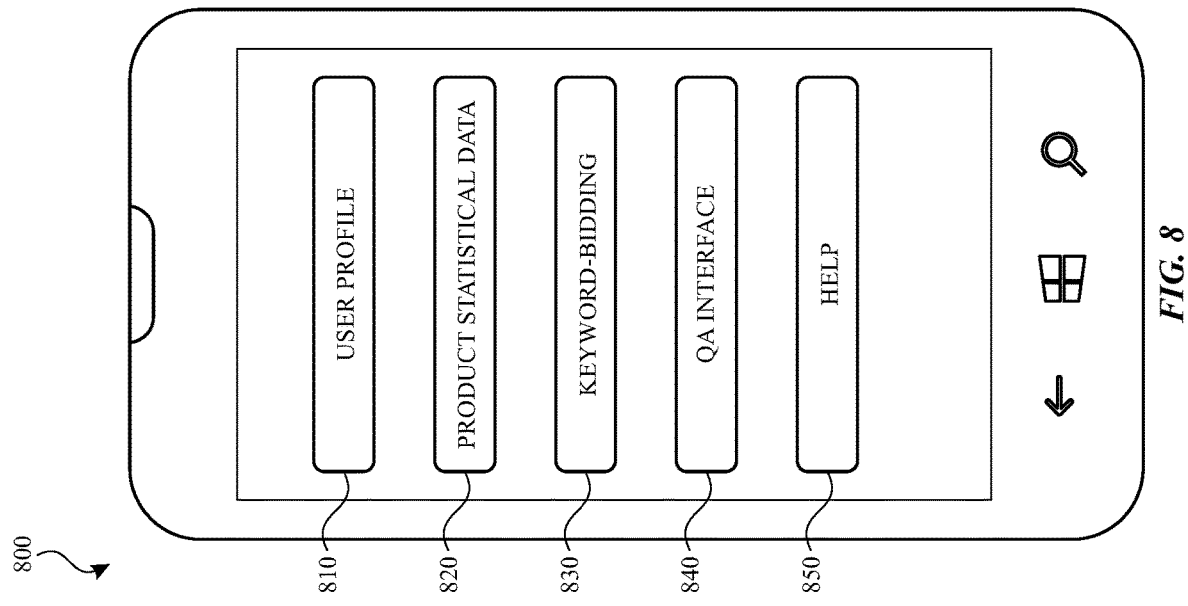
FIG. 8 illustrates an example user interface that may be provided on a computing device and used by various business entities to update, modify, create and track interactions with their artificial intelligence entities according to an example embodiment.

FIG. 8 illustrates an example user interface 800 that may be used by various business entities to update, modify, create and track interactions with their artificial intelligence entities. Each icon that is provided in the user interface 800 may provide the business entity with various information.

Figure 9:
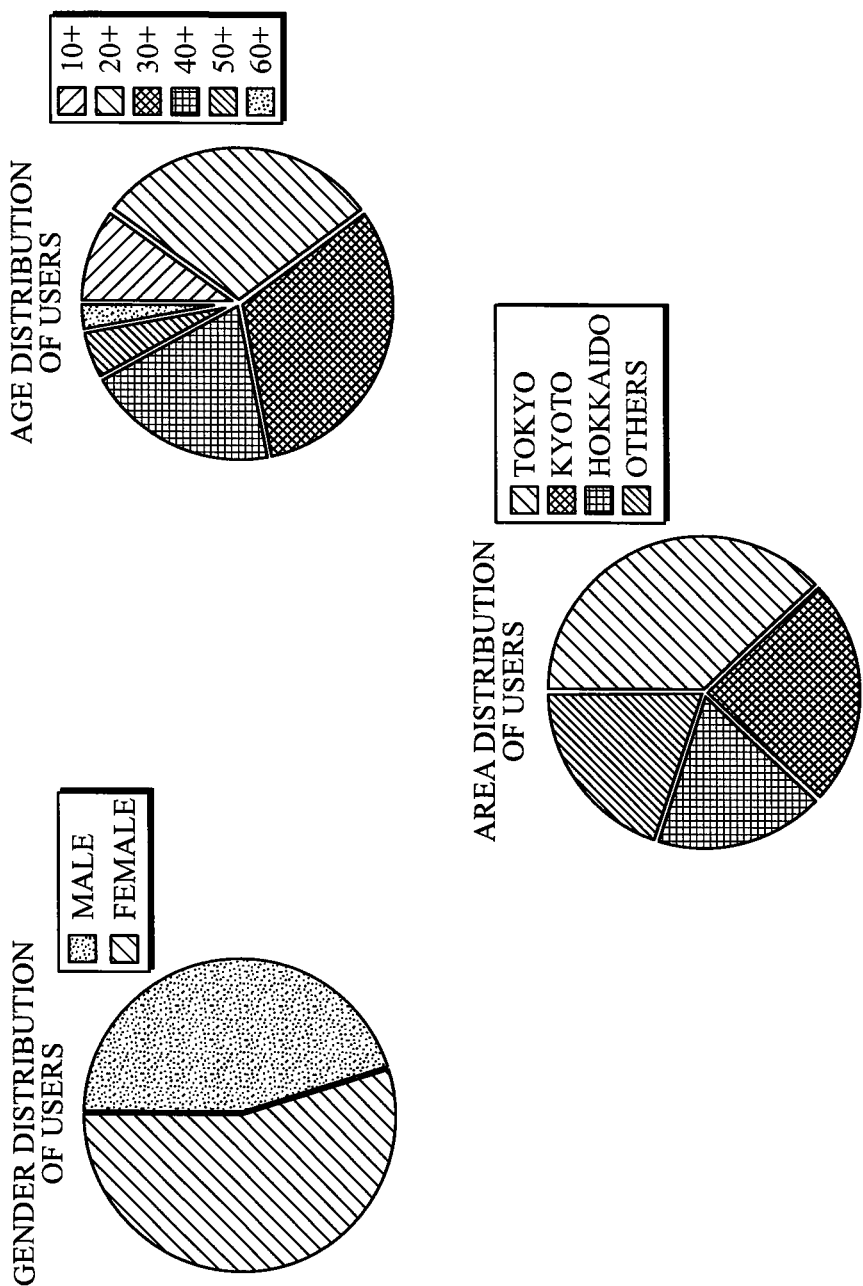
FIG. 9 illustrates example distribution graphs that may be provided to a business entity according to an example embodiment.

For example, selection of the "User profile" icon 810 may provide the business entities with information regarding distributions of gender, age, and areas (address/active places) of users that interact with their artificial intelligence entities. Example distribution graphs are shown in FIG. 9.

Although specific examples are shown, other data may be tracked and provided to the various business entities. The business entities may use this information to determine the effectiveness of their artificial intelligence entities and determine how to reach additional areas and/or individuals in different demographics. In aspects, the information that is accessed by selecting the user profile icon 810 may be provided by a character maintenance component, such as, for example, character maintenance component 260 (FIG. 2).

Figure 10:
FIG. 10 illustrates an example product ranking list that may be provided to a business entity according to an example embodiment.

Returning back to FIG. 8, when the "Product statistical data" icon 820 is selected, the ranking of popular products together with their click counts may be provided to the business entity. An example ranking of popular products is shown in FIG. 10. The product ranking list provides a way for the various business entities to balance and/or tune their strategy of producing/ordering various products.

Figure 11:
FIG. 11 illustrates an example keyword-bidding interface that may be provided to a business entity according to an example embodiment.

The user interface 800 also includes a "Keyword-bidding" icon 830. When selected, a keyword-bidding interface 1100 (FIG. 11) is provided to the business entity. The keyword-bidding interface 1100 provides a way for the business entity to balance and/or tune its strategy of bidding on specific keywords and/or categories. In some instances, the categories and keywords are generated and provided by the artificial intelligence entity advertisement system. In such cases, the business entity may be required to select categories and keywords from a set list. In other implementations the keywords and/or categories may be generated or otherwise created by the particular business entity. In aspects, the information that is accessed by selecting the Product statistical data icon 820 and/or Keyword-bidding icon 830 may be provided by a bidding component, such as, for example, bidding component 270 (FIG. 2).

In some instances, the keywords and their bidding prices may be used by the character recommendation component 250 (FIG. 2) when selecting an artificial intelligence entity from the pool of artificial intelligence entities. For example, if input from a user contains a keyword "pizza", the business entities, and their associated artificial intelligence entities that placed bids on this keyword will be ranked and have a higher priority than those business entities that have not placed a bid on this particular keyword. Additionally, a business entity that has a higher bidding price on a given keyword or category will have a higher ranking when compared to those with a lower bidding price. Accordingly, the artificial intelligence entity with the higher bidding price will have a higher probability to be recommended by the online advertisement system than one with a lower bidding price.

Referring back to FIG. 8, the user interface 800 may also include a "QA interface" icon 840. When this icon is selected, an interface that allows editorial question-answer pairs to be generated is provided to the user. In aspects, the QA interface provides a way for the business entities to determine frequently asked questions and provide answers for the frequently asked questions. In some aspects, updates that are made when this icon is selected are handled by the question/answer component 280 (FIG. 2).

In aspects, the user interface 800 may also include a help button 850. The help button provides information to the various users on the topics described above.

Figure 12:
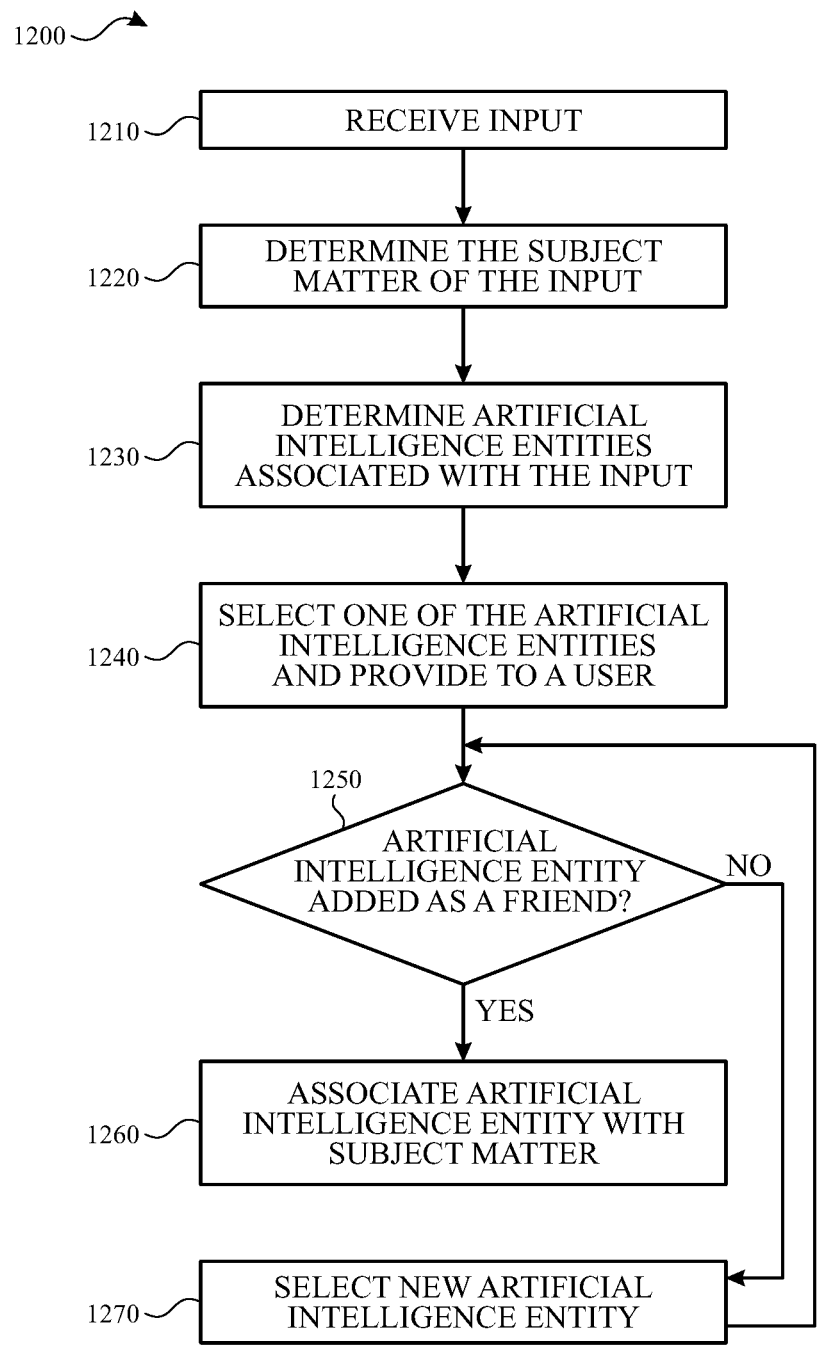
FIG. 12 illustrates a method for selecting an artificial intelligence entity based on received input according to an example embodiment.

FIG. 12 illustrates a method 1200 for selecting an artificial intelligence entity based on received input. In some aspects, the method 1200 may be used by the system 100 described above.

The method 1200 begins at operation 1210 in which input is received. In some aspects, the input may be received in a user interface such as, user interface 400 (FIG. 4). The input may take many forms and may be a query or a statement. In some aspects the input may be text input, audio or voice input, video input, image input, and so on.

Once the input is received, flow proceeds to operation 1220 and determination is made as to the subject matter of the input. In some embodiments, this determination may be made by determining one or more keywords or categories associated with the input. In some aspects, and depending on the type of input received (e.g., image input), the input may be need to be converted to text and a context of the text may need to be provided.

Flow then proceeds to operation 1230 and a determination is made as to which artificial intelligence entities in a pool of artificial intelligence entities are associated with the identified categories. In some aspects, business entities that create the artificial intelligence entities may bid on keywords and/or categories that their artificial intelligence entities are to be associated with.

In operation 1240 one of the artificial intelligence entities is selected and provided to the user. In some aspects, the artificial intelligence entities are ranked. The artificial intelligence entity with the highest rank may be the first one selected. The ranking may be based on a number of factors including, but not limited to, the dollar amount that the business entity bid on the particular keyword or category, demographic information of the user that provided the input, click history of the user that provided the input, and so on.

Flow then proceeds to operation 1250 and a determination is made as to whether the artificial intelligence entity that was provided to the user in operation 1240 was added as friend by the user. This determination is made based on received input from a user (e.g., an "Add" button associated with the artificial intelligence entity (see FIG. 7) was selected). If the artificial intelligence entity was added as a friend, flow proceeds to operation 1260 and the artificial intelligence entity is associated with the keyword and/or the category. Thus in subsequent interactions in which the input provided by the user includes the categories or keyword, the same artificial intelligence entity may be provided to the user.

If a determination is made in operation 1250 that the artificial intelligence entity was not added as a friend (or that the user wants to see additional artificial intelligence entities), flow proceeds to operation 1270 and a new artificial intelligence entity is selected and provided to the user. In some aspects, the new artificial intelligence entity that is selected may be the next highest ranked artificial intelligence entity that is associated with the subject matter. In other implementations, a new pool of artificial intelligence entities may be determined based on the newly provided click history. For example, the system may determine that since the user did not add the first artificial intelligence entity as a friend, the user has a high probability of rejecting the second ranked artificial intelligence entity on the list. As such a new list of possible artificial intelligence entities should be selected.

As described herein, when the artificial intelligence advertisement system described herein receives a query from the user, it needs to determine the user's consuming intentions. In order to accurately determine these intentions, training data may be extracted from received input. This training data may then be used to train the various components of the system.

In some instances, a classification model may be used to match a received query to a certain category or to certain business entities or companies. Once the matches are made, the classification model can be used to predict relevance probability of a particular company with respect to a received query. Training data in the format of <query, company> is used to train a model that outputs this relevance probability.

However, even though a company may be related to a particular query, many other companies may also be associated with the query. For example, the company 7-Eleven® may belong to a category convenience store. However, there are many other companies that are convenience stores. As such, additional classification techniques may be used in order to better predict the relevance probability of a category candidate in response to a query. Training data in the format of <query, category> are used to train a model that outputs this relevance probability.

In order to generate these models, clicked URLs for a given query from large-scale search engines are collected. Since each URL is supposed to correspond to a single webpage, document classification techniques are used to obtain the various categories of the webpage. Using these techniques, <query, category> training data may be generated. Additionally, the URLs that are related to a target company are also collected to construct <query, company> training data.

In some embodiments, the two models are separately trained using the following features: 1) Word ngrams, such as unigrams and bigrams for words (e.g., "hungry," "coffee," "food") in the query; 2) Character ngrams: for each word in the query, character ngrams are extracted; 3) Word skip-grams: for various trigrams and 4-grams in the query, one of the words is replaced by * to indicate the presence of non-contiguous words (e.g., words or characters that don't have any meaning in an input query are ignored); 4) Brown cluster ngrams: Brown clusters may be used to represent words in a query and unigrams and bigrams may be extracted as features. For example, "sushi" and "tempura" are types of Japanese food. Thus, if an input provided by the user indicates that the user wants Japanese food, business entities that bid on keywords of "sushi" and "tempura" may be included in the results as they belong to the same cluster; 5) Part-of-speech (POS) tags: the presence or absence of part-of-speech tags are used as binary features and may be ignored. Further, nouns, verbs and adjectives may be used to provide context or may be ignored. For example, if the query iced coffee is received, the term "iced" may be ignored or used to narrow (or expand) search results; 6) social network related words: the number of hashtags, emoticons, elongated words, and punctuations in the query may be used as features. For example, the input "I want to eat sushi" with a smiley face emoji may indicate how the user is currently feeling. This information may be used to recommend various products and services to the user; and 7) Word2vec cluster ngrams: a word2vec tool may be used to learn 100-dimensional word embedding from a social network dataset. A K-means algorithm and L2 distance of word vectors may be used to cluster the million level vocabulary into various classes. The classes are used to represent generalized words in the query.

In other aspects, a user profile component (such as user profile component 230 (FIG. 2)) may be used to predict the gender, age, and address/active place information of a user from a user's historical queries. The training data for this component may be manually created. For example, a gender classification model may have input of <user id, queries> and the output may consist of tags "male" or "female." A number of clues can be utilized in the queries to determine gender. For example, a query or input of "My wife is at home with the kids" is more likely to be spoken by a married man. Likewise, the query or input of "My husband is quite busy at work" is more likely spoken by a married woman.

An age prediction model may work in a similar way. For example, input for an age prediction model may also be represented as <user id, queries> and the output is a tag set of "10+" (for no less than ten years old and younger than 20 years old), "20+" (no less than 20 years old yet younger than 30 years old), "30+", "40+", "50+", and "60+", and so on. A number of clues can be utilized in the natural language queries, such as "I am in the $5^{th}$ grade" projects the user to be 10+. Likewise, the input of "I am graduating next year, it will be tough to find a job." projects the user is 20+.

For a location information detection model, the input may be represented as <user id, queries> and the output includes a number of places (e.g., cities). For places, there are also a number of clues can be used for the predication; for example, buying round trip tickets from Denver to Seattle indicates that the user probably lives in Denver.

Each of these models may be trained using the features described above. Additionally, a query intentions model may be used to determine age and/or gender. For example, a female user is more likely to search for various makeup companies or salons than a male user.

User click models may also be used to determine information about various users. More specifically, a user click model may predict a Click-Through-Rate (CTR) of product/character candidates to specific queries. The input for this user click model is a tuple of <user id, historical queries, current query>. The user profile model may be used to predict the gender, age, and active place information of a given user.

In yet another implementation, pairwise learning for constructing a relevance-based user-character recommendation model may be used. The recommendation model ranks available characters to a specific user under a specific query.

FIGS. 13-16 and the associated descriptions provide a discussion of a variety of operating environments in which aspects of the disclosure may be practiced. However, the devices and systems illustrated and discussed with respect to FIGS. 13-16 are for purposes of example and illustration and are not limiting of a vast number of electronic device configurations that may be utilized for practicing aspects of the disclosure, as described herein.

Figure 13:
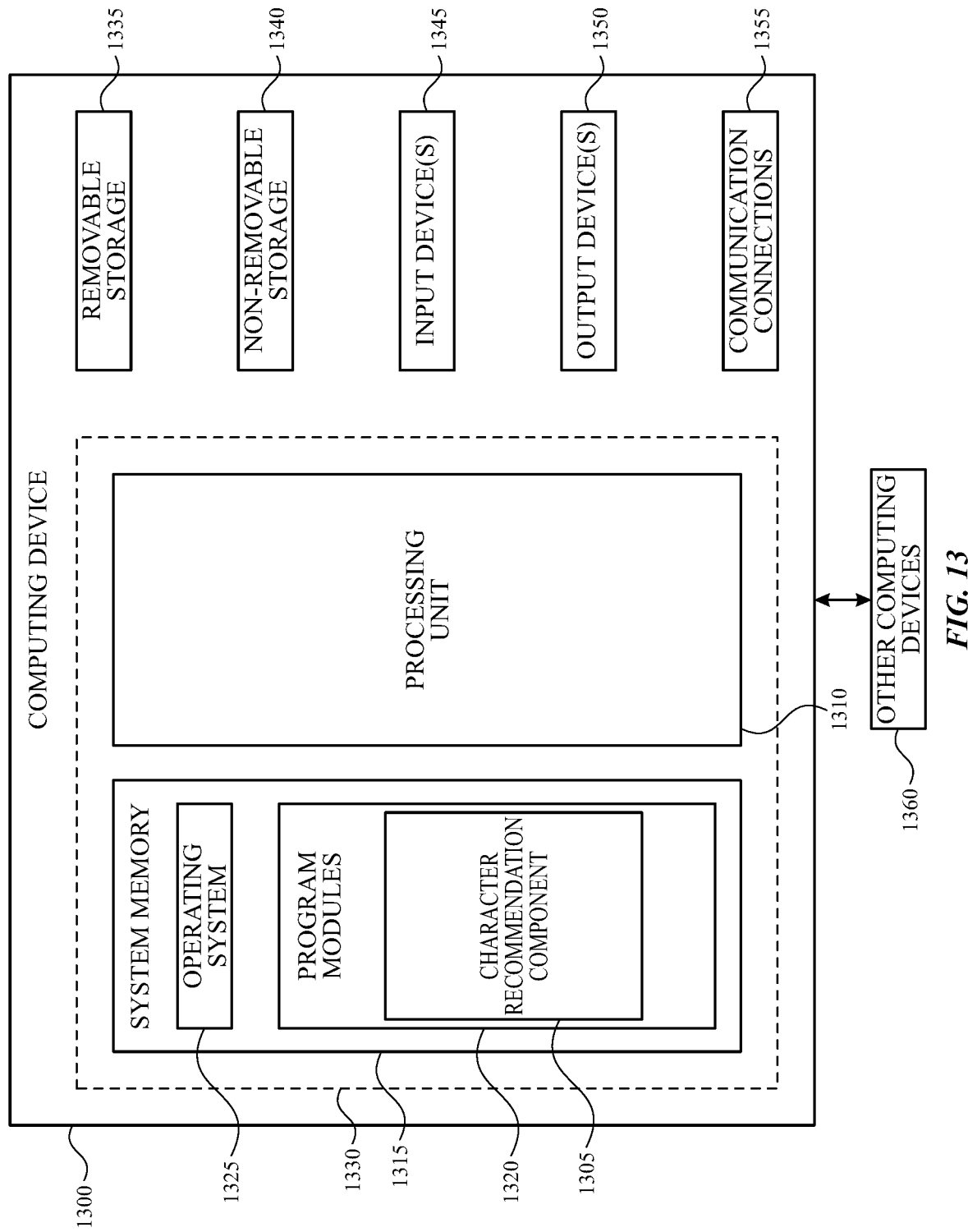
FIG. 13 is a block diagram illustrating example physical components of a computing device with which aspects of the disclosure may be practiced.

FIG. 13 is a block diagram illustrating physical components (e.g., hardware) of an electronic device 1300 with which aspects of the disclosure may be practiced. The components of the electronic device 1300 described below may have computer executable instructions for causing a character recommendation component 1305 to recommend various artificial intelligence entities to a user such as described above.

In a basic configuration, the electronic device 1300 may include at least one processing unit 1310 and a system memory 1315. Depending on the configuration and type of electronic device, the system memory 1315 may comprise, but is not limited to, volatile storage (e.g., random access memory), non-volatile storage (e.g., read-only memory), flash memory, or any combination of such memories. The system memory 1315 may include an operating system 1325 and one or more program modules 1320 suitable for parsing received input, determining subject matter of received input, recommending artificial intelligence entities, and so on.

The operating system 1325, for example, may be suitable for controlling the operation of the electronic device 1300. Furthermore, embodiments of the disclosure may be practiced in conjunction with a graphics library, other operating systems, or any other application program and is not limited to any particular application or system. This basic configuration is illustrated in FIG. 13 by those components within a dashed line 1330.

The electronic device 1300 may have additional features or functionality. For example, the electronic device 1300 may also include additional data storage devices (removable and/or non-removable) such as, for example, magnetic disks, optical disks, or tape. Such additional storage is illustrated in FIG. 13 by a removable storage device 1335 and a non-removable storage device 1340.

As stated above, a number of program modules and data files may be stored in the system memory 1315. While executing on the processing unit 1310, the program modules 1320 (e.g., the character recommendation component 1305) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 13 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 1300 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The electronic device 1300 may also have one or more input device(s) 1345 such as a keyboard, a trackpad, a mouse, a pen, a sound or voice input device, a touch, force and/or swipe input device, etc. The output device(s) 1350 such as a display, speakers, a printer, etc. may also be included. The aforementioned devices are examples and others may be used. The electronic device 1300 may include one or more communication connections 1355 allowing communications with other electronic devices 1360. Examples of suitable communication connections 1355 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 1315, the removable storage device 1335, and the non-removable storage device 1340 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 1300. Any such computer storage media may be part of the electronic device 1300. Computer storage media do not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 14A:
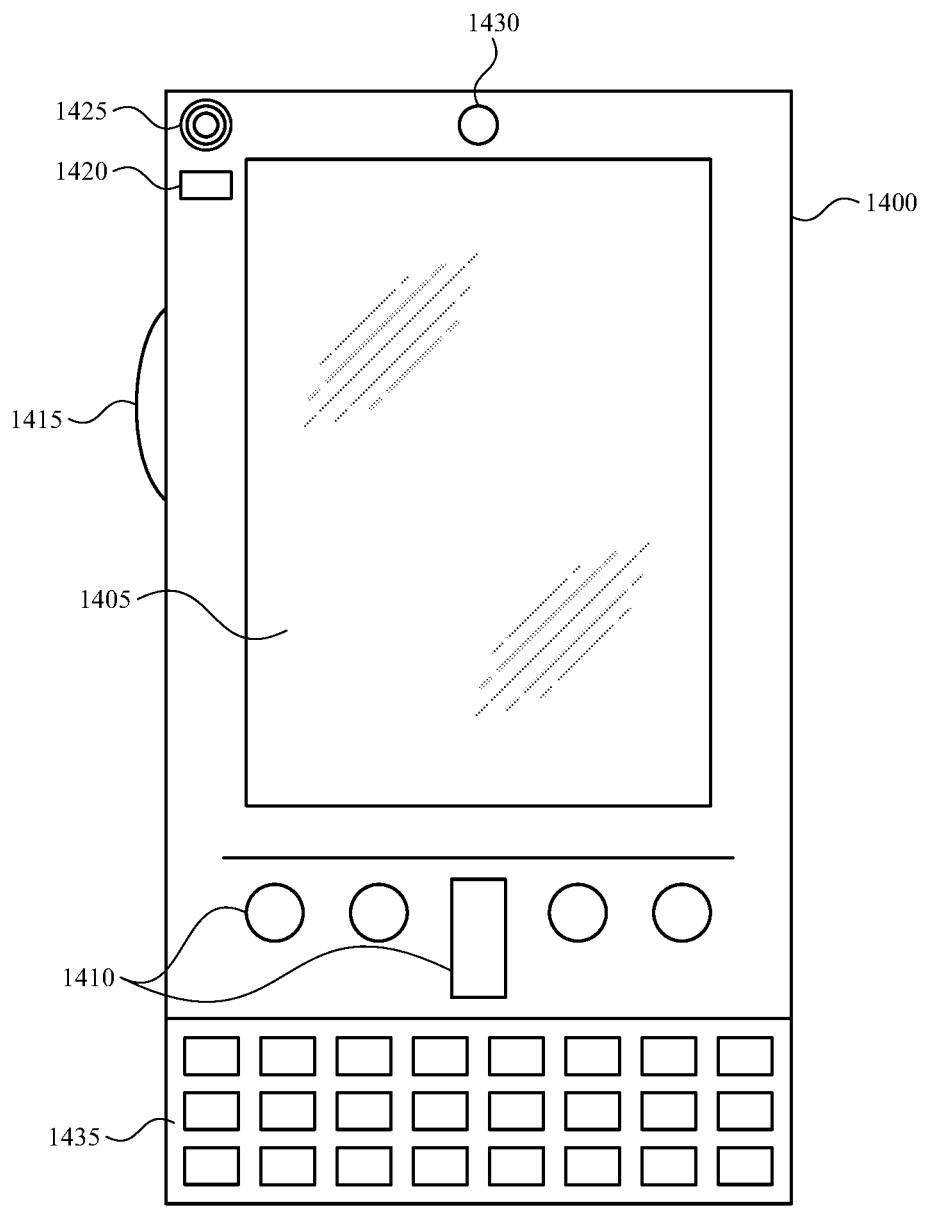
FIGS. 14A and 14B are simplified block diagrams of a mobile computing device with which aspects of the present disclosure may be practiced.
Figure 14B:
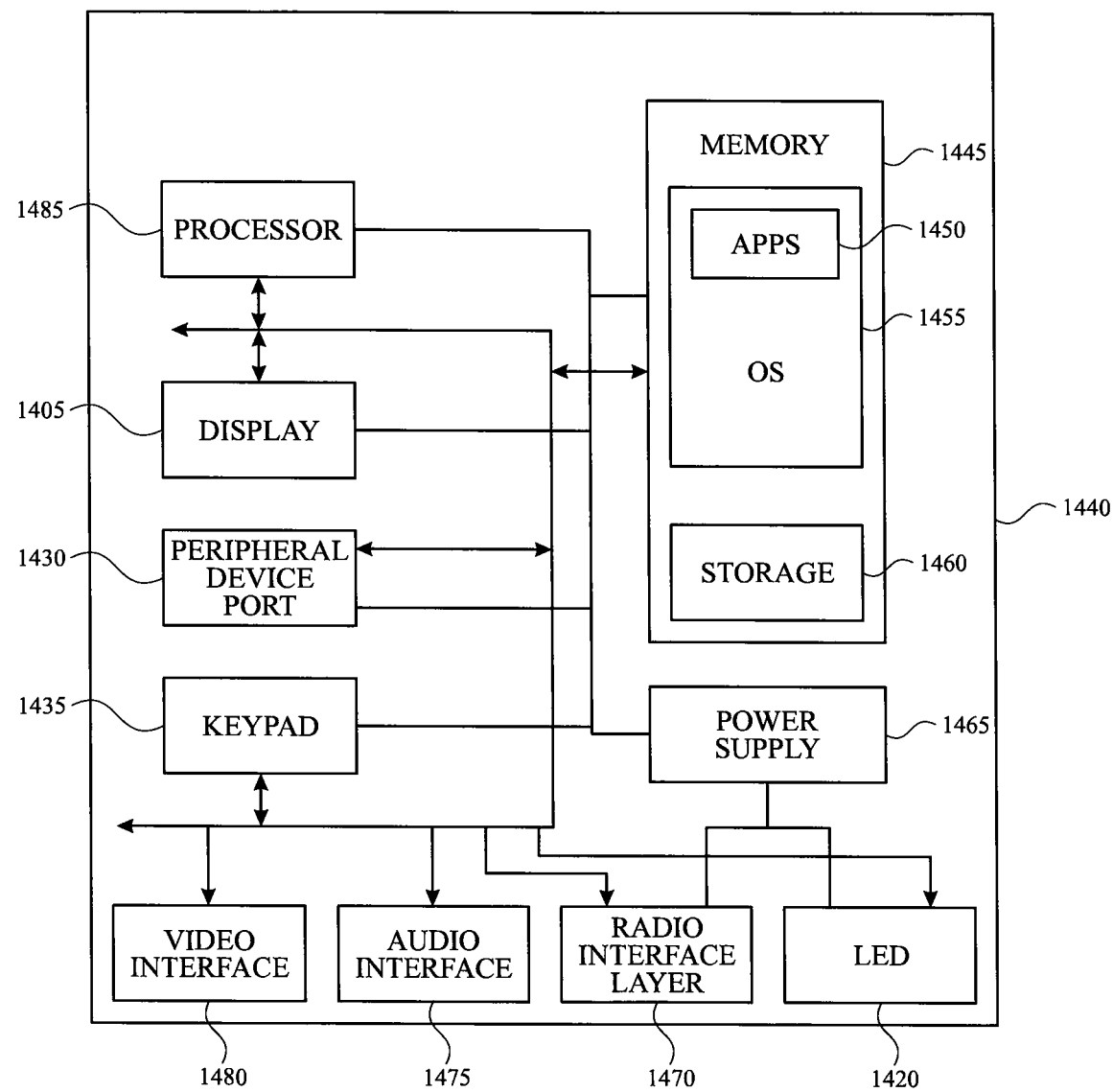

FIGS. 14A and 14B illustrate a mobile electronic device 1400, for example, a mobile telephone, a smart phone, wearable computer (such as a smart watch), a tablet computer, a laptop computer, and the like, with which embodiments of the disclosure may be practiced. With reference to FIG. 14A, one aspect of a mobile electronic device 1400 for implementing the aspects is illustrated.

In a basic configuration, the mobile electronic device 1400 is a handheld computer having both input elements and output elements. The mobile electronic device 1400 typically includes a display 1405 and one or more input buttons 1410 that allow the user to enter information into the mobile electronic device 1400. The display 1405 of the mobile electronic device 1400 may also function as an input device (e.g., a display that accepts touch and/or force input).

If included, an optional side input element 1415 allows further user input. The side input element 1415 may be a rotary switch, a button, or any other type of manual input element. In alternative aspects, mobile electronic device 1400 may incorporate more or fewer input elements. For example, the display 1405 may not be a touch screen in some embodiments. In yet another alternative embodiment, the mobile electronic device 1400 is a portable phone system, such as a cellular phone. The mobile electronic device 1400 may also include an optional keypad 1435. Optional keypad 1435 may be a physical keypad or a "soft" keypad generated on the touch screen display.

In various embodiments, the output elements include the display 1405 for showing a graphical user interface (GUI), a visual indicator 1420 (e.g., a light emitting diode), and/or an audio transducer 1425 (e.g., a speaker). In some aspects, the mobile electronic device 1400 incorporates a vibration transducer for providing the user with tactile feedback. In yet another aspect, the mobile electronic device 1400 incorporates input and/or output ports, such as an audio input (e.g., a microphone jack), an audio output (e.g., a headphone jack), and a video output (e.g., a HDMI port) for sending signals to or receiving signals from an external device.

FIG. 14B is a block diagram illustrating the architecture of one aspect of a mobile electronic device 1400. That is, the mobile electronic device 1400 can incorporate a system (e.g., an architecture) 1440 to implement some aspects. In one embodiment, the system 1440 is implemented as a "smart phone" capable of running one or more applications (e.g., browser, e-mail, calendaring, contact managers, messaging clients, games, media clients/players, content selection and sharing applications, and so on). In some aspects, the system 1440 is integrated as an electronic device, such as an integrated personal digital assistant (PDA) and wireless phone.

One or more application programs 1450 may be loaded into the memory 1445 and run on or in association with the operating system 1455. Examples of the application programs include phone dialer programs, e-mail programs, personal information management (PIM) programs, word processing programs, spreadsheet programs, Internet browser programs, messaging programs, and so forth.

The system 1440 also includes a non-volatile storage area 1460 within the memory 1445. The non-volatile storage area 1460 may be used to store persistent information that should not be lost if the system 1440 is powered down.

The application programs 1450 may use and store information in the non-volatile storage area 1460, such as email or other messages used by an email application, and the like. A synchronization application (not shown) also resides on the system 1440 and is programmed to interact with a corresponding synchronization application resident on a host computer to keep the information stored in the non-volatile storage area 1460 synchronized with corresponding information stored at the host computer.

The system 1440 has a power supply 1465, which may be implemented as one or more batteries. The power supply 1465 may further include an external power source, such as an AC adapter or a powered docking cradle that supplements or recharges the batteries.

The system 1440 may also include a radio interface layer 1470 that performs the function of transmitting and receiving radio frequency communications. The radio interface layer 1470 facilitates wireless connectivity between the system 1440 and the "outside world," via a communications carrier or service provider. Transmissions to and from the radio interface layer 1470 are conducted under control of the operating system 1455. In other words, communications received by the radio interface layer 1470 may be disseminated to the application programs 1450 via the operating system 1455, and vice versa.

The visual indicator 1420 may be used to provide visual notifications, and/or an audio interface 1475 may be used for producing audible notifications via an audio transducer (e.g., audio transducer 1425 illustrated in FIG. 14A). In the illustrated embodiment, the visual indicator 1420 is a light emitting diode (LED) and the audio transducer 1425 may be a speaker. These devices may be directly coupled to the power supply 1465 so that when activated, they remain on for a duration dictated by the notification mechanism even though the processor 1485 and other components might shut down for conserving battery power. The LED may be programmed to remain on indefinitely until the user takes action to indicate the powered-on status of the device.

The audio interface 1475 is used to provide audible signals to and receive audible signals from the user (e.g., voice input such as described above). For example, in addition to being coupled to the audio transducer 1425, the audio interface 1475 may also be coupled to a microphone to receive audible input, such as to facilitate a telephone conversation. In accordance with embodiments of the present disclosure, the microphone may also serve as an audio sensor to facilitate control of notifications, as will be described below.

The system 1440 may further include a video interface 1480 that enables an operation of peripheral device 1430 (e.g., on-board camera) to record still images, video stream, and the like. The captured images may be provided to the artificial intelligence entity advertisement system such as described above.

A mobile electronic device 1400 implementing the system 1440 may have additional features or functionality. For example, the mobile electronic device 1400 may also include additional data storage devices (removable and/or non-removable) such as, magnetic disks, optical disks, or tape. Such additional storage is illustrated in FIG. 14B by the non-volatile storage area 1460.

Data/information generated or captured by the mobile electronic device 1400 and stored via the system 1440 may be stored locally on the mobile electronic device 1400, as described above, or the data may be stored on any number of storage media that may be accessed by the device via the radio interface layer 1470 or via a wired connection between the mobile electronic device 1400 and a separate electronic device associated with the mobile electronic device 1400, for example, a server computer in a distributed computing network, such as the Internet. As should be appreciated such data/information may be accessed via the mobile electronic device 1400, via the radio interface layer 1470, or via a distributed computing network. Similarly, such data/information may be readily transferred between electronic devices for storage and use according to well-known data/information transfer and storage means, including electronic mail and collaborative data/information sharing systems.

As should be appreciated, FIG. 14A and FIG. 14B are described for purposes of illustrating the present methods and systems and is not intended to limit the disclosure to a particular sequence of steps or a particular combination of hardware or software components.

Figure 15:
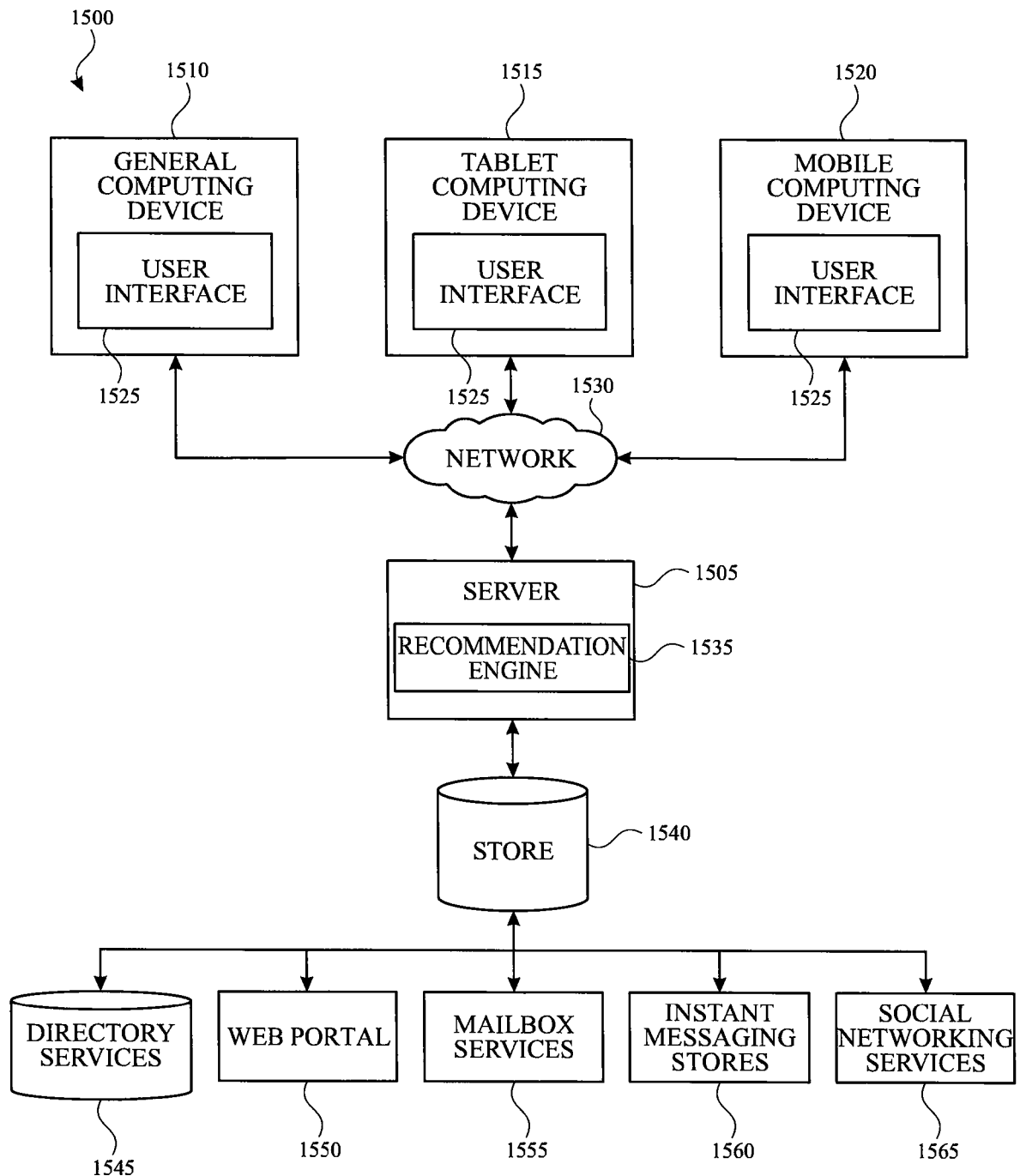
FIG. 15 is a simplified block diagram of a distributed computing system in which aspects of the present disclosure may be practiced.

FIG. 15 illustrates one aspect of the architecture of a system 1500 for recommending artificial intelligence entities to a user such as described herein. The system may include a general electronic device 1510 (e.g., personal computer), tablet electronic device 1515, or mobile electronic device 1520, as described above. Each of these devices may include a user interface 1525 for interacting with an artificial intelligence entity such as described above.

In some aspects, the user interface 1525 may receive various other types of information or content that is stored by or transmitted from a directory service 1545, a web portal 1550, mailbox services 1555, instant messaging stores 1560, or social networking services 1565.

In aspects, the user interface 1525 may be used to interact with artificial intelligence entities that are provided or hosted by a recommendation engine 1535 on a server 1505. The devices on which the user interfaces 1525 are provided may communicate with the server 1505 through a network 1530.

By way of example, the aspects described above may be embodied in a general electronic device 1510 (e.g., personal computer), a tablet electronic device 1515 and/or a mobile electronic device 1520 (e.g., a smart phone). Any of these embodiments of the electronic devices may obtain content from or provide data to the store 1540.

As should be appreciated, FIG. 15 is described for purposes of illustrating the present methods and systems and is not intended to limit the disclosure to a particular sequence of steps or a particular combination of hardware or software components.

Figure 16:
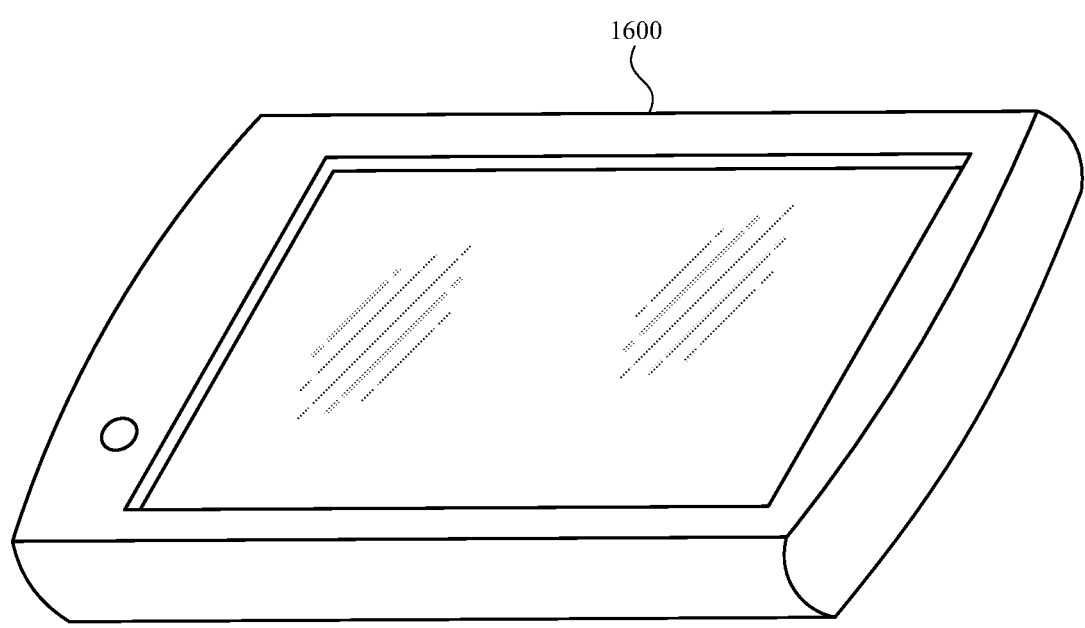
FIG. 16 illustrates a tablet computing device for executing one or more aspects of the present disclosure.

FIG. 16 illustrates an exemplary tablet electronic device 1600 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices. For example, user interfaces and information of various types may be displayed and interacted with on a wall surface onto which user interfaces and information of various types are projected. Interaction with the multitude of computing systems with which embodiments of the invention may be practiced include keystroke entry, touch screen entry, voice or other audio entry, gesture entry where an associated electronic device is equipped with detection (e.g., camera) functionality for capturing and interpreting user gestures for controlling the functionality of the electronic device, and the like.

As should be appreciated, FIG. 16 is described for purposes of illustrating the present methods and systems and is not intended to limit the disclosure to a particular sequence of steps or a particular combination of hardware or software components.

Among other examples, the present disclosure describes a processing unit; and a memory storing computer executable instructions which, when executed by the processing unit, causes the system to perform a method, comprising: receiving a query; parsing the query to determine one or more keywords contained in the query; determining one or more artificial intelligence entities that are associated with the one or more keywords, wherein each of the one or more artificial intelligence entities is associated with a business entity; selecting at least one of the one or more artificial intelligence entities based on ranking associated with the one or more artificial intelligence entities; and initiating a conversation session with the one of the one or more artificial intelligence entities. In further examples, the ranking is based, at least in part, on a bid provided by the business entity. In further examples, the ranking is based, at least in part, on a browsing history associated with the one or more keywords. In further examples, instructions are included for determining demographic information based, at least in part, on the query. In further examples, instructions are included for adding the one or the one or more artificial intelligence entities as a friend in the conversation system. In further examples, the one of the one or more artificial intelligence entities are associated with the one or more keywords. In further examples, instructions are included for selecting a different artificial intelligence entity based on received input. In further examples, the different artificial intelligence entity is associated with the one or more keywords.

Further aspects disclosed herein provide a method for providing an interaction with an artificial intelligence entity, comprising: receiving an input; analyzing the input to determine a subject matter associated with the input; determining, from a pool of artificial intelligence entities, one or more artificial intelligence entities that are associated with the subject matter; selecting one of the one or more artificial intelligence entities; providing an interaction with the one of the one or more artificial intelligence entities; and determining, based on received input, whether to associate the one of the one or more artificial intelligence entities with the subject matter. In further examples, the input is text input. In further examples, the input is an image. In further examples, the input is speech. In further examples, the one of the one or more artificial intelligence entities is associated with the subject matter based on the received input. In further examples, an interaction with a second one of the one or more artificial intelligence entities is provided based, at least in part, on the received input. In further examples, the second one of the one or more artificial intelligence is associated with the subject matter. In further examples, the one or more artificial intelligence entities are ranked based, at least in part, on a received monetary bid. In further examples, each artificial intelligence entity in the pool of artificial intelligence entities is associated with a business entity. In further examples, each artificial intelligence entity in the pool of artificial intelligence entities is customizable by the business entity.

Also provided is a computer-readable storage medium storing computer executable instructions which, when executed by a processing unit, causes the processing unit to perform a method for providing a conversation session with an artificial intelligence entity associated with a business entity, comprising: receiving an input associated with a subject matter; determining whether an artificial intelligence entity is associated with the subject matter; when it is determined that an artificial intelligence entity is associated with the subject matter, providing the conversation session with the artificial intelligence entity; and when it is determined that an artificial intelligence entity is not associated with the subject matter: selecting a new artificial intelligence entity from a pool of artificial intelligence entities; and providing a conversation session with the new artificial intelligence entity. In further examples, instructions are provided for selecting the new artificial intelligence entity from the pool of artificial intelligence entities based, at least in part, on a monetary bid on the subject matter.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, comprising:
a processing unit; and
a memory storing computer executable instructions that, when executed by the processing unit, causes the system to perform operations, comprising:
receiving, from a remote computing device, a query;
parsing the query to identify one or more keywords contained in the query;
identifying, from a pool of artificial intelligence entities, one or more artificial intelligence entities that are associated with the one or more keywords, wherein each of the one or more artificial intelligence entities in the pool of artificial intelligence entities is associated with a different business entity;
automatically selecting one of the one or more artificial intelligence entities from the pool of artificial intelligence entities based, at least in part, on a ranking associated with the one or more artificial intelligence entities, wherein the ranking is based, at least in part, on one or more attributes associated with the one or more artificial intelligence entities and one or more determined characteristics of an individual that provided the query;

initiating a conversation session between the automatically selected one of the one or more artificial intelligence entities and the individual;

during or in response to the conversation session, providing, to the individual, a friend request from the automatically selected one of the one or more artificial intelligence entities;

determining whether the friend request was accepted based on a response from the individual to the friend request;

responsive to determining that the friend request was accepted, adding the automatically selected one of the one or more artificial intelligence entities as a friend of the individual such that when the one or more keywords are subsequently received from the remote computing device, an additional conversation session between the automatically selected one of the one or more artificial intelligence entities and the individual is automatically initiated; and responsive to determining that the friend request was not accepted, automatically selecting a second of the one or more artificial intelligence entities from the pool of artificial intelligence entities and initiating a conversation session between the automatically selected second of the one or more artificial intelligence entities and the individual.

2. The system of claim 1, wherein the ranking is based, at least in part, on a bid provided by the business entity.

3. The system of claim 1, wherein the ranking is based, at least in part, on a browsing history associated with the one or more keywords.

4. The system of claim 1, further comprising instructions for determining demographic information based, at least in part, on the query.

5. The system of claim 1, further comprising instructions for selecting a different artificial intelligence entity based on received input.

6. The system of claim 5, further comprising associating the different artificial intelligence entity with the one or more keywords.

7. The system of claim 1, wherein the automatically selecting one of the one or more artificial intelligence entities from the pool of artificial intelligence entities is further based on at least one of:
a determined subject matter associated with the one or more keywords;
one or more friended artificial intelligence entities, the one or more friended artificial intelligence entities being selected as friends by the individual;
interests of the individual; or
demographic information of the individual.

8. The system of claim 1, wherein the selected second of the one or more artificial intelligence entities comprises a next highest ranked artificial intelligence entity in the pool of artificial intelligence entities.

9. The system of claim 1, wherein the selected second of the one or more artificial intelligence entities is selected from a new pool of artificial intelligence entities.

10. A computer-implemented method for providing an interaction with an artificial intelligence entity, comprising:
receiving, from a remote computing device, information corresponding to an input;
analyzing the input to determine a subject matter associated with the input;
identifying, from a pool of artificial intelligence entities, one or more artificial intelligence entities that are associated with the subject matter, wherein at least two artificial intelligence entities in the pool of artificial intelligence entities are associated with different business entities;
automatically selecting one of the one or more artificial intelligence entities from the pool of artificial intelligence entities based, at least in part, on one or more attributes associated with the selected one of the one or more artificial intelligence entities and on one or more determined characteristics of an individual that provided the input;
initiating an interaction with the automatically selected one of the one or more artificial intelligence entities, the selected one of the one or more artificial intelligence entities being associated with a business entity, wherein the selected one of the one or more artificial intelligence entities is configured to be an advertising medium for the business entity;
during or in response to the conversation session, providing, to the individual, a friend request from the automatically selected one of the one or more artificial intelligence entities;
determining whether the friend request was accepted based on a response from the individual to the friend request;
responsive to determining that the friend request was accepted, adding the automatically selected one of the one or more artificial intelligence entities as a friend of the individual such that another interaction with the automatically selected one of the one or more artificial intelligence entities is initiated based on additional input associated with the subject matter being received; and
responsive to determining that the friend request was not accepted, automatically selecting a second of the one or more artificial intelligence entities from the pool of artificial intelligence entities and initiating a conversation session between the automatically selected second of the one or more artificial intelligence entities and the individual.

11. The method of claim 10, wherein the input is text input.

12. The method of claim 10, wherein the input is an image.

13. The method of claim 10, wherein the input is speech.

14. The method of claim 10, further comprising associating the automatically selected one of the one or more artificial intelligence entities with the subject matter based on the received input.

15. The method of claim 10, further comprising providing an interaction with a second one of the one or more artificial intelligence entities based, at least in part, on the received input.

16. The method of claim 15, further comprising associating the second one of the one or more artificial intelligence entities with the subject matter.

17. The method of claim 10, further comprising ranking the one or more artificial intelligence entities based, at least in part, on a received monetary bid.

18. The method of claim 10, wherein the at least two artificial intelligence entities are customizable by the different business entities.

19. The method of claim 10, wherein the subject matter is associated with a monetary bid.

20. The computer-implemented method of claim 10, wherein the selected second of the one or more artificial intelligence entities comprises a next highest ranked artificial intelligence entity in the pool of artificial intelligence entities.

21. A system, comprising:
a processor; and
a memory coupled to the processor and storing instructions that, when executed by the processor, perform operations, comprising:
receiving, via a remote computing device, information corresponding to an input;
determining a subject matter of the input;
determining whether an artificial intelligence entity is associated with the subject matter; and
based on determining that the artificial intelligence entity is not associated with the subject matter:
automatically selecting a new artificial intelligence entity from a pool of artificial intelligence entities, wherein at least two of the artificial intelligence entities in the pool of artificial intelligence entities are associated with different business entities, and wherein the selection is based, at least in part, on;
one or more attributes associated with the new artificial intelligence entity;
one or more determined characteristics of an individual that provided the input; and
a monetary bid on the subject matter;
initiating, via a user interface on the remote computing device, an interaction with the automatically selected new artificial intelligence entity, wherein the selected new artificial intelligence entity is configured for use as an advertising medium for a business entity;
during or in response to the conversation session, providing, to the individual, a friend request from the new artificial intelligence entity;
determining whether the friend request was accepted based on a response from the individual to the friend request;
responsive to determining that the friend request was accepted, adding the new artificial intelligence entity as a friend of the individual such that a subsequent interaction with the new artificial intelligence entity is initiated when additional input associated with the subject matter is subsequently received; and
responsive to determining that the friend request was not accepted, automatically selecting a second of the one or more artificial intelligence entities from the pool of artificial intelligence entities and initiating a conversation session between the automatically selected second of the one or more artificial intelligence entities and the individual.

22. The system of claim 21, further comprising instructions for determining whether to associate the new artificial intelligence entity with the subject matter, based at least in part, on information corresponding to received input.

23. The system of claim 21, wherein the pool of artificial intelligence entities are ranked based on a set of monetary bids from a set of business entities.

24. The system of claim 21, wherein the selected second of the one or more artificial intelligence entities comprises a next highest ranked artificial intelligence entity in the pool of artificial intelligence entities.

* * * * *